US009099936B2

(12) United States Patent
Gupta et al.

(10) Patent No.: US 9,099,936 B2
(45) Date of Patent: Aug. 4, 2015

(54) HIGH VOLTAGE DIRECT CURRENT (HVDC) CONVERTER SYSTEM AND METHOD OF OPERATING THE SAME

(71) Applicant: General Electric Company, Schenectady, NY (US)

(72) Inventors: Ranjan Kumar Gupta, Schenectady, NY (US); Nilanjan Ray Chaudhuri, Niskayuna, NY (US); Luis Jose Garces, Niskayuna, NY (US); Rajib Datta, Nikayuna, NY (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 13/826,583

(22) Filed: Mar. 14, 2013

(65) Prior Publication Data

US 2014/0268926 A1 Sep. 18, 2014

(51) Int. Cl.
*H02M 5/44* (2006.01)
*H02M 1/12* (2006.01)
*H02M 1/15* (2006.01)
*H02M 7/757* (2006.01)
*H02M 1/00* (2007.01)

(52) U.S. Cl.
CPC ............... *H02M 5/44* (2013.01); *H02M 1/126* (2013.01); *H02M 1/15* (2013.01); *H02M 7/7575* (2013.01); *H02M 2001/0077* (2013.01); *Y02E 60/60* (2013.01)

(58) Field of Classification Search
USPC .......................................................... 363/35
See application file for complete search history.

(56) References Cited

U.S. PATENT DOCUMENTS

| 4,517,635 | A | 5/1985 | Kelley, Jr. |
| 5,202,583 | A | 4/1993 | Larsen et al. |
| 5,371,664 | A | 12/1994 | Seki |
| 5,535,113 | A | 7/1996 | Konishi |

(Continued)

FOREIGN PATENT DOCUMENTS

| CN | 1832318 A | 9/2006 |
| CN | 102394557 A | 3/2012 |

(Continued)

OTHER PUBLICATIONS

U.S. Appl. No. 14/201,062, filed Mar. 7, 2014 entitled Hybrid High Voltage Direct Current Converter System and Method of Operating the Same.

(Continued)

*Primary Examiner* — Emily P Pham
(74) *Attorney, Agent, or Firm* — Nitin N. Joshi

(57) ABSTRACT

A high voltage direct current (HVDC) converter system includes a line commutated converter (LCC) configured to convert a plurality of AC voltages and currents to a regulated DC voltage of one of positive and negative polarity and a DC current transmitted in only one direction. The HVDC converter system also includes a buck converter configured to convert a plurality of AC voltages and currents to a regulated DC voltage of one of positive and negative polarity and a DC current transmitted in one of two directions. The LCC and the buck converter are coupled in parallel to an AC conduit and are coupled in series to a DC conduit. The HVDC converter system further includes a filtering device coupled in parallel to the buck converter through the AC conduit. The filtering device is configured to inject AC current having at least one harmonic frequency into the AC conduit.

20 Claims, 11 Drawing Sheets

(56) References Cited

U.S. PATENT DOCUMENTS

| | | | |
|---|---|---|---|
| 5,751,563 | A | 5/1998 | Bjorklund |
| 5,910,889 | A | 6/1999 | Larsen et al. |
| 8,030,791 | B2 | 10/2011 | Lang et al. |
| 8,203,586 | B2 | 6/2012 | Kaneko et al. |
| 8,300,435 | B2 | 10/2012 | Björklund et al. |
| 2007/0216390 | A1* | 9/2007 | Wai et al. ............... 323/351 |
| 2010/0309698 | A1 | 12/2010 | Asplund et al. |
| 2011/0025447 | A1 | 2/2011 | Jacobson et al. |
| 2011/0310641 | A1 | 12/2011 | Asplund et al. |
| 2012/0020135 | A1 | 1/2012 | Mccune |
| 2012/0026760 | A1 | 2/2012 | Juhlin |
| 2012/0033462 | A1 | 2/2012 | Juhlin |
| 2012/0043923 | A1* | 2/2012 | Ikriannikov et al. ......... 320/103 |
| 2012/0092904 | A1 | 4/2012 | Nuqui et al. |
| 2012/0218672 | A1 | 8/2012 | Nunes et al. |
| 2012/0250371 | A1 | 10/2012 | Fischer De Toledo |
| 2013/0197704 | A1* | 8/2013 | Pan et al. ............... 700/287 |
| 2013/0301313 | A1* | 11/2013 | Jiang-Hafner ............. 363/35 |

FOREIGN PATENT DOCUMENTS

| | | |
|---|---|---|
| CN | 102738819 A | 10/2012 |
| CN | 102904242 A | 1/2013 |
| CN | 102969732 A | 3/2013 |
| EP | 2556585 A1 | 2/2013 |
| WO | 9522848 | 8/1995 |
| WO | 2010069371 A1 | 6/2010 |
| WO | 2011124258 A1 | 10/2011 |
| WO | 2011134521 A1 | 11/2011 |
| WO | 2012130296 A1 | 10/2012 |

OTHER PUBLICATIONS

U.S. Appl. No. 14/200,937, filed Mar. 7, 2014 entitled Hybrid High Voltage Direct Current Converter Systems.

U.S. Appl. No. 13/629,882, filed Sep. 28, 2012 entitled Multilevel Converter System.

Honglin Zhou, et al. Control of DFIG-Based Wind Farms with Hybrid HVDC Connection, IEEE, 2009, pp. 1085-1091.

Y. Li, et al., A Class a New HVDC Transmission Modes Improved by Inductive Filtering Methods, Internation Conference on Power System Technology, 2010, pp. 1-7.

Behazad Qahraman, Series/Parallel Hybrid VSC-LCC for HVdc Transmission Systems, Department of Electrical and Computer Engineering, Univesity of Manitoba, 2010, 171 pages.

Omar Kotb, A Hyrbrid LCC-VSC HVDC, University of Ontario Institute of Technology, 2010, 107 pages.

P.F. De Toledo, et al., Frequency Domain Model of an Hvdc Link with a Line-Commutated Current-source Converter. Part 1: Fixed Overlap, IET Gener. Transm. Distrib., 2009, 757-770, vol. 3, iss. 8, The Institution of Engineering and Technology.

Menzies, Donald F., et al., "Garabi" the Argentina—Brazil 1000 MW Interconnection Commissioning and Early Operating Experience, ERLAC Conference, 2001, 5 pages.

Graham, John, et al., The Garabi 2000 MW Interconnection back-to-Back HVDC to Connect WEak AC Systems, ABB Utilities, 8 pages.

Andersen, Bjarne R., et al., Hybrid HVDC System for Power Transmission to Island Networks, IEEE Transcations on Power Delivery, 2004, 1884-1890, vol. 19, No. 4.

Barthurst G.N., et al., Harmonic Modelling of Networks Containing Line-Commutated Voltage-sourced Coverters, 14th PSCC, 2002, 7 pages, Session 28, Paper 1.

Carpinelli et al., "Steady-State Mathematical Models of Battery Storage Plants With Line-Commutated Converters", IEEE Transactions on Power Delivery, Issue Date : Apr. 1993, vol. 8 , Issue: 2 pp. 494-503.

Gole et al., "An AC Active Filter for Use at Capacitor Commutated HVDC Converters", IEEE Transactions on Power Delivery, Issue Date : Apr. 2001, vol. 16, Issue: 2, pp. 335-341.

Qahraman, B., et al., "Hybrid HVDC Converters and Their Impact on Power System Dynamic Performance", 2006 IEEE Power Engineering Society General Meeting, Jun. 18-22, 2006, pp. 1-6, Piscataway, NJ, USA.

Hongbo, Jiang, et al., Harmonic Cancellation of a Hybrid Converter, IEEE Transactions on Power Delivery, Oct. 1998, pp. 1291-1296, vol. 13, No. 4, New York, NY, USA.

Okba, Mohamed H., et al., "Harmonics in HVDC Links, Part II—Effects and Reduction Techniques", IECON 2012—38th Annual Conference on IEEE Industrial Electronics Society, Oct. 25, 2012, pp. 1328-1336.

Andersen, Bjarne R., et al., "Hybrid HVDC System for Power Transmission to Island Networks", 2003 IEEE PES Transmission and Distribution Conference Proceedings, Sep. 7-12, 2003, pp. 55-60, vol. 1, New York, NY, USA.

PCT Search Report and Written Opinion issued Jun. 5, 2014 in connection with corresponding PCT Patent Application No. PCT/US2014/017587.

Qahraman, B. and Gole, A., "A VSC Based Series Hybrid Converter for HVDC Transmission," CCECE/CCGEI, Saskatoon, May 2005, pp. 458-461.

* cited by examiner

HIGH VOLTAGE DIRECT CURRENT (HVDC) CONVERTER SYSTEM AND METHOD OF OPERATING THE SAME

BACKGROUND

The field of the disclosure relates generally to high voltage direct current (HVDC) transmission systems and, more particularly, to HVDC converter systems and a method of operation thereof.

At least some of known electric power generation facilities are physically positioned in a remote geographical region or in an area where physical access is difficult. One example includes power generation facilities geographically located in rugged and/or remote terrain, for example, mountainous hillsides, extended distances from the customers, and off-shore, e.g., off-shore wind turbine installations. More specifically, these wind turbines may be physically nested together in a common geographical region to form a wind turbine farm and are electrically coupled to a common alternating current (AC) collector system. Many of these known wind turbine farms include a separated power conversion assembly, or system, electrically coupled to the AC collector system. Such known separated power conversion assemblies include a rectifier portion that converts the AC generated by the power generation facilities to direct current (DC) and an inverter that converts the DC to AC of a predetermined frequency and voltage amplitude. The rectifier portion of the separated power conversion assembly is positioned in close vicinity of the associated power generation facilities and the inverter portion of the separated full power conversion assembly is positioned in a remote facility, such as a land-based facility. Such rectifier and inverter portions are typically electrically connected via submerged high voltage direct current (HVDC) electric power cables that at least partially define an HVDC transmission system.

Many known power converter systems include rectifiers that include line commutated converters (LCCs). LCC-based rectifiers typically use thyristors for commutation to "chop" three-phase AC voltage through firing angle control to generate a variable DC output voltage. Commutation of the thyristors requires a stiff, i.e., substantially nonvarying, grid voltage. Therefore, for those regions without a stiff AC grid, converters with such rectifiers cannot be used. Also, a "black start" using such a HVDC transmission system is not possible. Further, such known thyristor-based rectifiers require significant reactive power transmission from the AC grid to the thyristors, with some reactive power requirements representing approximately 50% to 60% of the rated power of the rectifier. Moreover, thyristor-based rectifiers facilitate significant transmission of harmonic currents from the AC grid, e.g., the $11^{th}$ and $13^{th}$ harmonics, such harmonic currents typically approximately 10% of the present current loading for each of the $11^{th}$ and $13^{th}$ harmonics. Therefore, to compensate for the harmonic currents and reactive power, large AC filters are installed in the associated AC switchyard. In some known switchyards, the size of the AC filter portion is at least 3 times greater than the size of the associated thyristor-based rectifier portion. Such AC filter portion of the switchyard is capital-intensive due to the land required and the amount of large equipment installed. In addition, a significant investment in replacement parts and preventative and corrective maintenance activities increases operational costs.

In addition, many known thyristors in the rectifiers switch only once per line cycle. Therefore, such thyristor-based rectifiers exhibit operational dynamic features that are less than optimal for generating smoothed waveforms. Also, typically, known thyristor-based LCCs are coupled to a transformer and such transformer is constructed with heightened ratings to accommodate the reactive power and harmonic current transmission through the associated LCC. Moreover, for those conditions that include a transient, or fault, on either of the AC side and the DC side of the thyristor-based rectifier, interruption of proper commutation may result.

BRIEF DESCRIPTION

In one aspect, a high voltage direct current (HVDC) converter system is provided. The high voltage direct current (HVDC) converter system includes at least one line commutated converter (LCC) and at least one buck converter. The at least one LCC and the at least one buck converter are coupled in parallel to at least one alternating current (AC) conduit and are coupled in series to at least one direct current (DC) conduit. The at least one LCC is configured to convert a plurality of AC voltages and currents to a regulated DC voltage of one of positive and negative polarity and a DC current transmitted in only one direction. The at least one buck converter is configured to convert a plurality of AC voltages and currents to a regulated DC voltage of one of positive and negative polarity and a DC current transmitted in one of two directions. The HVDC converter system includes at least one filtering device coupled in parallel to the at least one buck converter through the at least one AC conduit. The at least one filtering device is configured to inject AC current having at least one harmonic frequency into the at least one AC conduit.

In a further aspect, a method of transmitting high voltage direct current (HVDC) electric power is provided. The method includes providing at least one line commutated converter (LCC) and coupling at least one buck converter in parallel to the at least one LCC through at least one AC conduit and in series through at least one DC conduit. The method also includes coupling at least one filtering device in parallel to the at least one buck converter through the at least one AC conduit. The method further includes defining a predetermined voltage differential across a HVDC transmission system with the at least one LCC. The method also includes injecting AC current having at least one harmonic frequency into the HVDC converter system from the at least one filtering device. The method further includes controlling a value of current transmitted through the HVDC transmission system with the at least one buck converter.

In another aspect, a high voltage direct current (HVDC) transmission system is provided. The HVDC transmission system includes at least one alternating current (AC) conduit and at least one direct current (DC) conduit. The system also includes a plurality of HVDC transmission conduits coupled to the at least one DC conduit. The system further includes a HVDC converter system. The HVDC converter system includes at least one line commutated converter (LCC) configured to convert a plurality of AC voltages and currents to a regulated DC voltage of one of positive and negative polarity and a DC current transmitted in only one direction. The HVDC converter system also includes at least one buck converter configured to convert a plurality of AC voltages and currents to a regulated DC voltage of one of positive and negative polarity and a DC current transmitted in one of two directions. The at least one LCC and the at least one buck converter are coupled in parallel to the at least one AC conduit and are coupled in series to the at least one DC conduit. The HVDC converter system includes at least one filtering device coupled in parallel to the at least one buck converter through the at least one AC conduit. The at least one filtering device is configured to inject AC current having at least one harmonic frequency into the at least one AC conduit.

DRAWINGS

These and other features, aspects, and advantages of the present invention will become better understood when the following detailed description is read with reference to the accompanying drawings in which like characters represent like parts throughout the drawings, wherein.

Figure 1:
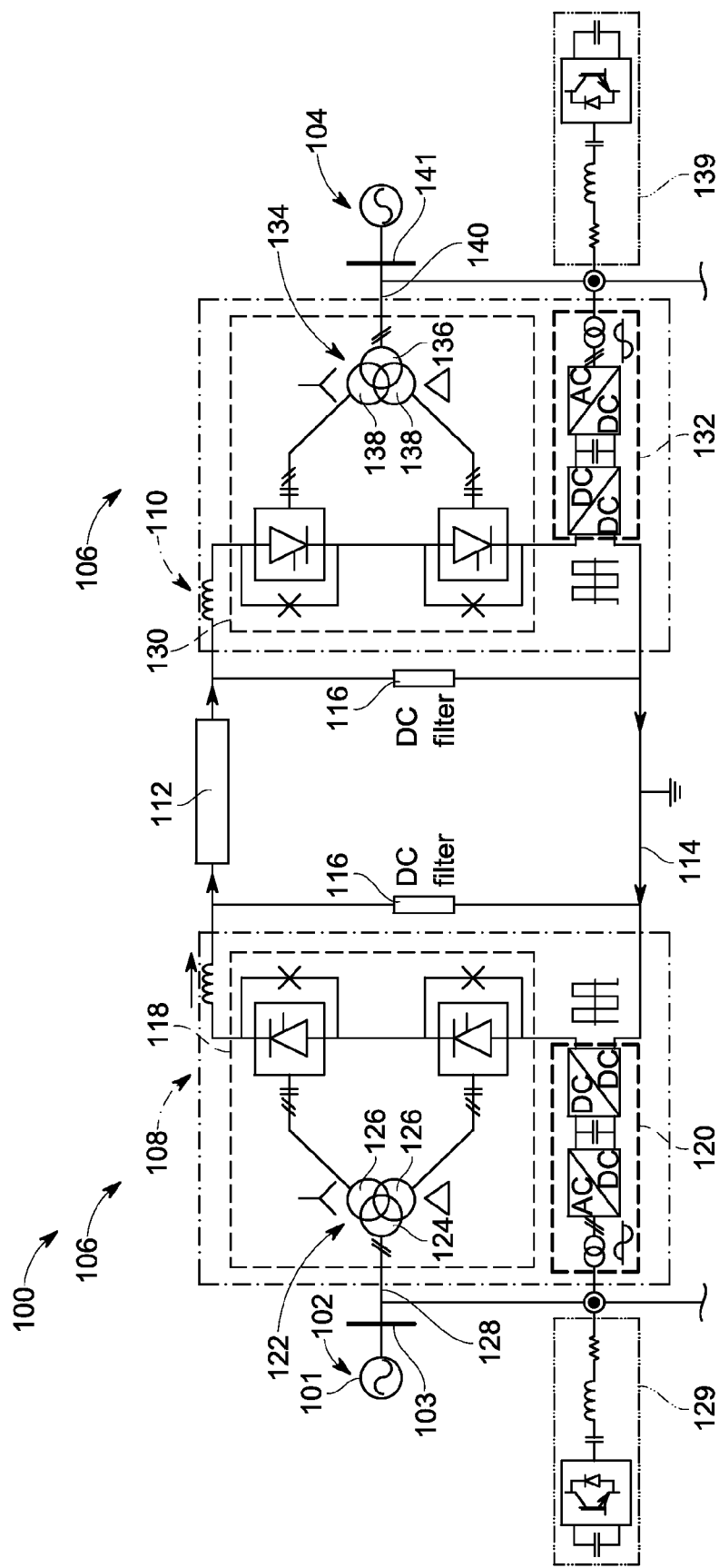
FIG. 1 is a schematic view of an exemplary high voltage direct current (HVDC) transmission system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "black start" refers to providing electric power to at least one power generation facility in a geographically-isolated location from a source external to the power generation facility. A black start condition is considered to exist when there are no electric power generators in service in the power generation facility and there are no other sources of electric power in the geographically-isolated power generation facility to facilitate a restart of at least one electric power generator therein.

The hybrid HVDC transmission systems described herein provide a cost-effective method for transmitting HVDC power. The embodiments described herein facilitate transmitting HVDC power between an AC facility and an AC grid, both either remote from each other or coupled back-to-back. Specifically, the devices, systems, and methods described herein facilitate enabling black start of a remote AC facility, e.g., an off-shore wind farm. Also, the devices, systems, and methods described herein facilitate decreasing reactive power requirements of associated converter systems while also providing for supplemental reactive power transmission features. Specifically, the devices, systems, and methods described herein include using a series capacitor in a line commutated converter (LCC), thereby facilitating operation of the associated inverter at very low values of commutation angles. Additionally, the series capacitor described herein facilitates decreasing the rating of the associated buck converters, reducing the chances of commutation failure of the thyristors in the event of either an AC-side or DC-side transient and/or fault, and cooperating with the buck converters to decrease the commutation angle of the associated thyristors. Therefore, the LCC generates the majority of the DC voltage and the buck converter generates sufficient DC voltage to control the residual DC voltage, thereby facilitating control of either the output DC current or precise control of the DC output voltage.

Further, the devices, systems, and methods described herein facilitate significantly decreasing, and potentially eliminating, large and expensive switching AC filter systems, capacitor systems, and reactive power compensation devices, thereby facilitating decreasing a physical footprint of the associated system. The devices, systems, and methods described herein may compensate for dominant harmonics, e.g., the $11^{th}$ and $13^{th}$ harmonics, as well as non-characteristic harmonics, e.g., the $3^{rd}$ harmonic. Specifically, the hybrid filter devices described herein compensate for such dominant harmonics. Also, the buck converters described herein compensate for such non-characteristic harmonics in addition to partially compensating for the dominant harmonics.

Moreover, the devices, systems, and methods described herein enhance dynamic power flow control and transient load responses. Specifically, the buck converters described herein, based on the direction of power flow, control the DC line current such that the buck regulators regulate power flow, including providing robust control of the power flow such that faster responses to power flow transients are accommodated. The effects of AC grid voltage transients, up to approximately 10% of grid rated voltage, on the output DC voltage is reduced by fast action of the buck converters, thereby decreasing a need for tap changer operation of associated converter transformers. Therefore, the use of converter transformer tap changers is significantly reduced under sustained under/over voltage conditions on the AC grid. The buck converter accordingly generates the appropriate compensating voltages. Furthermore, the LCCs described herein quickly reduce the DC link voltage in the event of DC-side fault, Also, the rectifier and inverter portions described herein facilitate reducing converter transformer ratings and AC voltage stresses on the associated transformer bushings due to the control operation performed by the buck converter both in steady state and transient operation.

FIG. 1 is a schematic view of an exemplary high voltage direct current (HVDC) transmission system 100. HVDC transmission system 100 couples an alternating current (AC) electric power system 102 to another AC electric power system 104. In the exemplary embodiment, system 102 is an electric power generation facility and system 104 is an AC transmission and distribution grid. Alternatively, systems 102 and 104 may be any AC systems that enable operation of AC and DC power systems as described herein.

Electric power system 102 may include one power generation device 101, for example, one wind turbine generator. Alternatively, electric power system 102 may include a plurality of wind turbine generators (none shown) that may be at least partially grouped geographically and/or electrically to define a renewable energy generation facility, i.e., a wind farm (not shown). Such a wind turbine farm may be defined by a number of wind turbine generators in a particular geographic area, or alternatively, defined by the electrical connectivity of each wind turbine generator to a common substation. Also, such a wind turbine farm may be physically positioned in a remote geographical region or in an area where physical access is difficult. For example, and without limitation, such a wind turbine farm may be geographically located in rugged and/or remote terrain, e.g., mountainous hillsides, extended distances from the customers, and offshore, e.g., off-shore wind turbine installations. Further, alternatively, electric power system 102 may include any type of electric generation system including, for example, solar power generation systems, fuel cells, thermal power generators, geothermal generators, hydropower generators, diesel generators, gasoline generators, and/or any other device that generates power from renewable and/or non-renewable energy sources. Power generation devices 101 are coupled at an AC collector 103. Associated equipment such as, and without limitation, circuit breakers and isolators are not shown for simplicity.

HVDC transmission system 100 includes a separated power conversion system 106. Separated power conversion system 106 includes a rectifier portion 108 that is electrically coupled to electric power system 102. Rectifier portion 108 receives and converts three-phase, alternating current (AC) voltage and currents in electric power system 102 and rectifies the three-phase, AC power to direct current (DC) power at a predetermined voltage. Alternatively, any AC power with any number of phases may be used that enables operation of the Ac and DC systems as described herein.

Separated power conversion system 106 also includes an inverter portion 110 that is electrically coupled to electric power transmission and distribution grid 104. Inverter portion 110 receives DC power transmitted from rectifier portion 108 and converts the DC power to three-phase, AC power with pre-determined voltages, currents, and frequencies. In the exemplary embodiment, and as discussed further below, rectifier portion 108 and inverter portion 110 are substantially similar, and depending on the mode of control, they are operationally interchangeable.

Rectifier portion 108 and inverter portion 110 are coupled electrically through a plurality of HVDC transmission conduits 112 and 114. In the exemplary embodiment, HVDC transmission system 100 includes a uni-polar configuration and conduit 112 is maintained at either a positive voltage potential or a negative potential and conduit 114 is maintained at a substantially neutral, or ground potential. Alternatively, HVDC transmission system 100 may have a bi-polar configuration, as discussed further below. HVDC transmission system 100 also includes a plurality of DC filters 116 coupled between conduits 112 and 114.

HVDC transmission conduits 112 and 114 include any number and configuration of conductors, e.g., without limitation, cables, ductwork, and busses that are manufactured of any materials that enable operation of HVDC transmission system 100 as described herein. In at least some embodiments, portions of HVDC transmission conduits 112 and 114 are at least partially submerged. Alternatively, portions of HVDC transmission conduits 112 and 114 extend through geographically rugged and/or remote terrain, for example, mountainous hillsides. Further, alternatively, portions of HVDC transmission conduits 112 and 114 extend through distances that may include hundreds of kilometers (miles).

In the exemplary embodiment, rectifier portion 108 includes a rectifier line commutated converter (LCC) 118 coupled to HVDC transmission conduit 112. Rectifier portion 108 also includes a rectifier buck converter 120 coupled to rectifier LCC 118 and HVDC transmission conduit 114. Buck converter 120 is configured to generate either a positive or negative output voltage. Rectifier portion 108 further includes a rectifier LCC transformer 122 that either steps up or steps down the voltage received from electric power system 102. Transformer 122 includes one set of primary windings 124 and two substantially similar sets of secondary windings 126. Transformer 122 is coupled to electric power generation system 102 through a plurality of first AC conduits 128 (only one shown). Also, transformer 122 includes a tap changer device (not shown) that facilitates control of the turns ratio therein. Alternatively, transformer 122 includes any configuration that enables operation of rectifier portion 108 and HVDC transmission system 100 as described herein.

Rectifier portion 108 also includes a rectifier hybrid filtering device 129 coupled to rectifier buck converter 120 and first AC conduits 128. Rectifier hybrid filtering device 129 is an active filtering device configured to inject AC current having at least one harmonic frequency into rectifier portion 108, and specifically, rectifier LCC 118. The harmonic frequencies generated by rectifier hybrid filtering device 129 at least partially compensate for the harmonic frequencies by actively generating such harmonic frequencies out of phase of the harmonic frequencies generated and/or transmitted elsewhere in rectifier portion 108. Such compensation preferably cancels a significant portion of predetermined harmonic frequencies in rectifier portion 108 prior to transmission therefrom.

Similarly, in the exemplary embodiment, inverter portion 110 also includes an inverter LCC 130 coupled to HVDC transmission conduit 112. Inverter portion 110 also includes an inverter buck converter 132 coupled to inverter LCC 130 and HVDC transmission conduit 114. Inverter LLC 130 is substantially similar to rectifier LCC 118 and inverter buck converter 132 is substantially similar to rectifier buck converter 120.

Inverter portion 110 further includes an inverter LCC transformer 134 that either steps down or steps up the voltage transmitted to grid 104. Transformer 134 includes one set of primary windings 136 and two substantially similar sets of secondary windings 138. Inverter LCC transformer 134 is coupled to grid 104 through a plurality of second AC conduits 140 (only one shown) and an AC collector 141. In the exemplary embodiment, transformers 122 and 134 have a wye-delta configuration. Inverter LCC transformer 134 is substantially similar to rectifier LCC transformer 122. Alternatively, rectifier LCC transformer 122 and inverter LCC transformer 134 are any type of transformers with any configuration that enables operation of HVDC transmission system 100 as described herein.

Inverter portion 110 also includes an inverter hybrid filtering device 139 coupled to inverter buck converter 132 and second AC conduits 140. Inverter hybrid filtering device 139 is an active filtering device configured to inject AC current having at least one harmonic frequency into inverter portion 110, and specifically, inverter LCC 130. Inverter hybrid filtering device 139 is substantially similar to rectifier hybrid filtering device 129.

Figure 2:
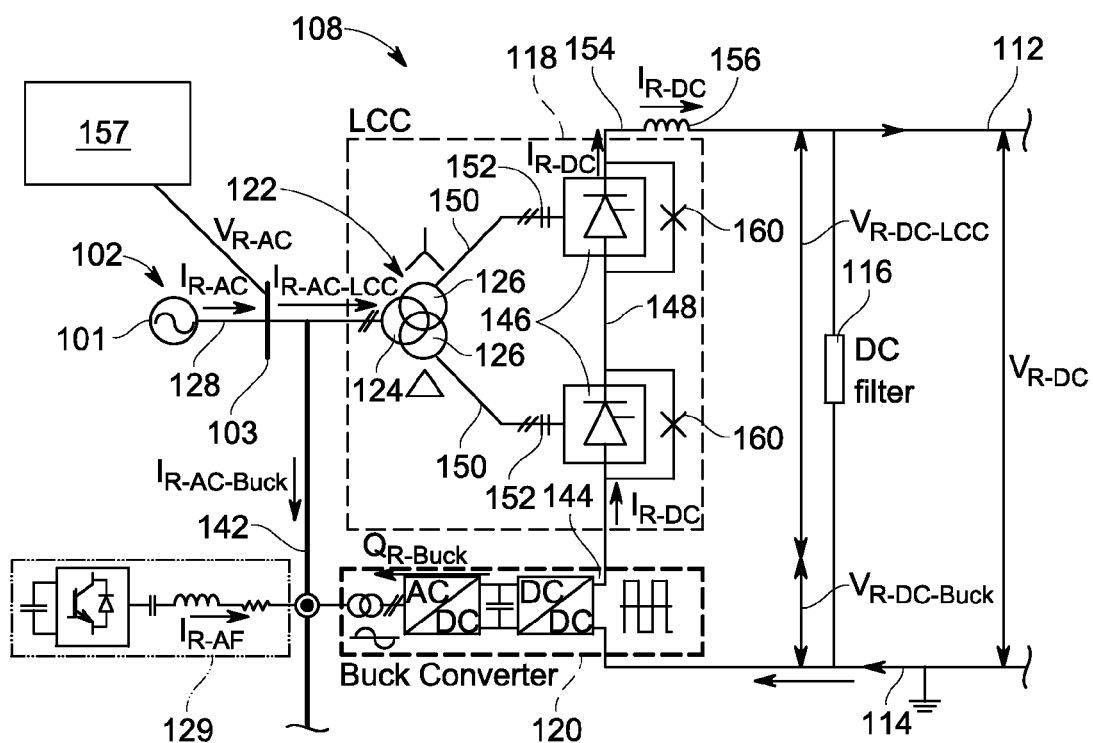
FIG. 2 is a schematic view of an exemplary rectifier portion that may be used with the HVDC transmission system shown in FIG. 1.

FIG. 2 is a schematic view of rectifier portion 108 of HVDC transmission system 100 (shown in FIG. 1). In the exemplary embodiment, primary windings 124 are coupled to electric power system 102 through first AC conduits 128. Rectifier buck converter 120 is coupled to first AC conduits 128 between electric power system 102 and primary windings 124 through a rectifier buck converter conduit 142. Therefore, rectifier buck converter 120 and rectifier LCC 118 are coupled in parallel with electric power system 102. Moreover, rectifier buck converter 120 and rectifier LCC 118 are coupled in series with each other through a DC conduit 144.

Also, in the exemplary embodiment, rectifier LCC 118 includes a plurality of HVDC rectifier devices 146 (only two shown) coupled to each other in series through a DC conduit 148. Each of HVDC rectifier devices 146 is coupled in parallel to one of secondary windings 126 through a plurality of AC conduit 150 (only one shown in FIG. 2) and a series capacitive device 152. At least one HVDC rectifier device 146 is coupled to HVDC transmission conduit 112 through an HVDC conduit 154 and an inductive device 156. Also, at least one HVDC rectifier device 146 is coupled in series to rectifier buck converter 120 through DC conduit 144.

Figure 3:
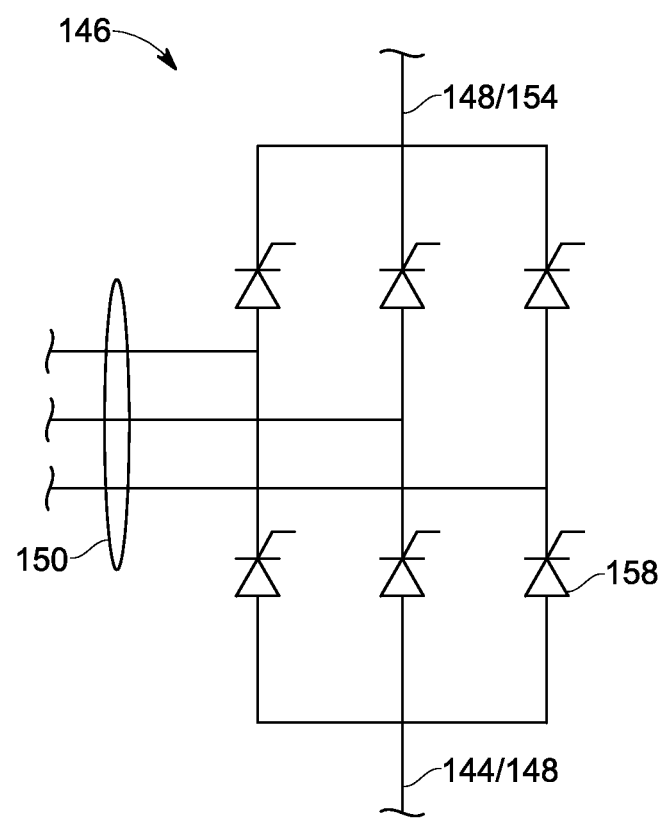
FIG. 3 is a schematic view of an exemplary HVDC rectifier device that may be used with the rectifier portion shown in FIG. 2.

FIG. 3 is a schematic view of an exemplary HVDC rectifier device 146 that may be used with rectifier portion 108 (shown in FIG. 2), and more specifically, with rectifier LCC 118 (shown in FIG. 2). In the exemplary embodiment, HVDC rectifier device 146 is a thyristor-based device that includes a plurality of thyristors 158. Alternatively, HVDC rectifier device 146 uses any semiconductor devices that enable operation of rectifier LCC 118, rectifier portion 108, and HVDC transmission system 100 (shown in FIG. 1) as described herein, including, without limitation insulated gate commutated thyristors (IGCTs) and insulated gate bipolar transistors (IGBTs).

Referring again to FIG. 2, rectifier buck converter 120 and rectifier LCC 118 are coupled in a cascading series configuration between HVDC transmission conduits 112 and 114. Moreover, a voltage of $V_{R\text{-}DC\text{-}LCC}$ is induced across rectifier LCC 118, a voltage of $V_{R\text{-}DC\text{-}Buck}$ is induced across rectifier buck converter 120, and $V_{R\text{-}DC\text{-}LCC}$ and $V_{R\text{-}DC\text{-}Buck}$ are summed to define $V_{R\text{-}DC}$, i.e., the total DC voltage induced between HVDC transmission conduits 112 and 114 by rectifier portion 108. Furthermore, an electric current of $I_{R\text{-}AC\text{-}LCC}$ is drawn through rectifier LCC 118, an electric current of $I_{R\text{-}AC\text{-}Buck}$ is drawn through rectifier buck converter 120, and $I_{R\text{-}AC\text{-}LCC}$ and $I_{R\text{-}AC\text{-}Buck}$ are summed to define the net electric current (AC) drawn from electric power system 102, i.e., $I_{R\text{-}AC}$. First AC conduits 128 are operated at an AC voltage of $V_{R\text{-}AC}$ as induced by electric power system 102.

Further, in the exemplary embodiment, rectifier LCC 118 is configured to convert and transmit active AC power within a range between approximately 85% and approximately 100% of a total active AC power rating of HVDC transmission system 100. LCC 118 converts a plurality of AC voltages, i.e., $V_{R\text{-}AC}$, and currents, i.e., $I_{R\text{-}AC\text{-}LCC}$, to a regulated DC voltage, i.e., $V_{R\text{-}DC\text{-}LCC}$, of one of either a positive polarity or a negative polarity, and a DC current transmitted in only one direction.

Moreover, in the exemplary embodiment, rectifier buck converter 120 is configured to convert and transmit active AC power within a range between approximately 0% and approximately 15% of the total active AC power rating of HVDC transmission system 100. Buck converter 120 converts a plurality of AC voltages, i.e., $V_{R\text{-}AC}$ and currents, i.e., $I_{R\text{-}AC\text{-}LCC}$, to a regulated DC voltage, i.e., $V_{R\text{-}DC\text{-}Buck}$, of one of either a positive polarity and a negative polarity, and a DC current transmitted in one of two directions.

Both rectifier LCC 118 and rectifier buck converter 120 are both individually configured to generate and transmit all of a net electric current (DC) generated by rectifier portion 108, i.e., rated $I_{R\text{-}DC}$. Also, rectifier buck converter 120 is configured to control its output DC voltage, positive or negative based on the direction of power flow, up to approximately 15% of $V_{R\text{-}DC}$ to facilitate control of $I_{R\text{-}DC}$. Further, rectifier buck converter 120 facilitates generating reactive power $Q_{R\text{-}Buck}$ for the electric power transmitted from power system 102. In addition, rectifier buck converter 120 facilitates compensating for non-characteristic harmonic AC currents, for example, and without limitation, the $3^{rd}$ harmonic, as compared to characteristic, dominant harmonic AC currents, e.g., the $11^{th}$ and $13^{th}$ harmonics. Such non-characteristic harmonic AC currents may be required to facilitate operation of rectifier LCC transformer 122 due to possible impedance mismatches between the delta and wye windings. However, rectifier buck converter 120 also facilitates compensating for the dominant harmonic AC currents.

Moreover, in the exemplary embodiment, thyristors 158 (shown in FIG. 3) of HVDC rectifier device 146 are configured to operate with firing angles α of ≤5°. As used herein, the term "firing angle" refers to an angular difference in degrees along a 360° sinusoidal waveform between the point of the natural firing instant of thyristors 158 and the point at which thyristors 158 are actually triggered into conduction, i.e., the commutation angle. The associated firing lag facilitates an associated lag between the electric current transmitted through thyristor 158 and the voltage induced by thyristor 158. Therefore, HVDC rectifier device 146, and as a consequence, rectifier portion 108 and separated power conversion system 106 (shown in FIG. 1) are net consumers of reactive power. The amount of reactive power consumed is a function of firing angle α, i.e., as firing angle α increases, the reactive power consumed increases. In addition, the magnitude of the induced voltage is also a function of firing angle α, i.e., as firing angle α increases, the magnitude of the induced voltage decreases.

Therefore, in the exemplary embodiment, $V_{R\text{-}DC\text{-}LCC}$ represents a much greater percentage of $V_{R\text{-}DC}$ than does $V_{R\text{-}DC\text{-}Buck}$, i.e., approximately 85% or higher as compared to approximately 15% or lower, respectively, and subsequently, the reactive power consumption of rectifier LCC 118 is reduced to a substantially low value, i.e., less than 20% of the power rating of rectifier LCC 118. In addition, rectifier LCC 118 is configured to quickly decrease $V_{R\text{-}DC}$ in the event of a DC fault or DC transient.

Moreover, in the exemplary embodiment, rectifier LCC 118 is configured to establish the transmission voltage such that $V_{R\text{-}DC\text{-}LCC}$ is approximately equal to a $V_{I\text{-}DC\text{-}LCC}$ (not shown in FIG. 2, and discussed further below) at inverter LCC 130 (shown in FIG. 1). In some embodiments, rectifier LCC transformer 122 has a turns ratio value of primary windings 124 to secondary windings 126 such that $V_{R\text{-}DC\text{-}LCC}$ is substantially equal to the $V_{I\text{-}DC}$ value (not shown in FIG. 2, and discussed further below) induced at HVDC inverter portion 110. Furthermore, rectifier buck converter 120 is configured to regulate $V_{R\text{-}DC\text{-}Buck}$ such that rectifier buck converter 120 effectively regulates $I_{R\text{-}DC}$ through substantially an entire range of operational values of current transmission though HVDC transmission system 100. As such, electric power orders, i.e., electric dispatch commands may be implemented through a control system (not shown) coupled to rectifier buck converter 120.

Also, the effects of changes in voltage at AC electric power system 102 on the output DC voltage $V_{R\text{-}DC}$ is substantially reduced by quick action of buck converter 120 by changing $V_{R\text{-}DC\text{-}Buck}$. Such action thereby reduces the use of the tap changers operatively coupling primary winding 124 and secondary windings 126 in rectifier LCC transformer 122 to a large extent which results in increased service life of transformer 122 or facilitates a low maintenance cycle thereof.

Also, in the exemplary embodiment, each series capacitive device 152 facilitates a decrease in the predetermined reactive power rating of rectifier buck converter 120 by facilitating an even lower value of firing angle α, including a negative value if desired, for rectifier LCC 118. The overall power rating for rectifier buck converter 120 is reduced which facilitates decreasing the size and costs of rectifier portion 108. Further, the accumulated electric charges in each series capacitive device 152 facilitates commutation ride-through, i.e., a decreases in the potential of short-term commutation failure in the event of short-term AC-side and/or DC-side electrical transients. Therefore, rectifier LCC 118 facilitates regulation of firing angle α.

Rectifier LCC 118 also includes a switch device 160 that is coupled in parallel with each associated HVDC rectifier device 146. In the exemplary embodiment, switch device 160 is manually and locally operated to close to bypass the associated HVDC rectifier device 146. Alternatively, switch device 160 may be operated remotely.

Moreover, a plurality of auxiliary loads (not shown) for electric power system 102 are powered from first AC conduits 128 and/or AC collector 103. Such auxiliary loads may include wind turbine support equipment including, without limitation, blade pitch drive motors, shaft bearing lubrication drive motors, solar array sun-following drive motors, and turbine lube oil pumps (none shown). Therefore, these auxiliary loads are typically powered with a portion of electric power generated by at least one of electric power generators 101 through first AC conduits 128 and/or AC collector 103.

Figure 4:
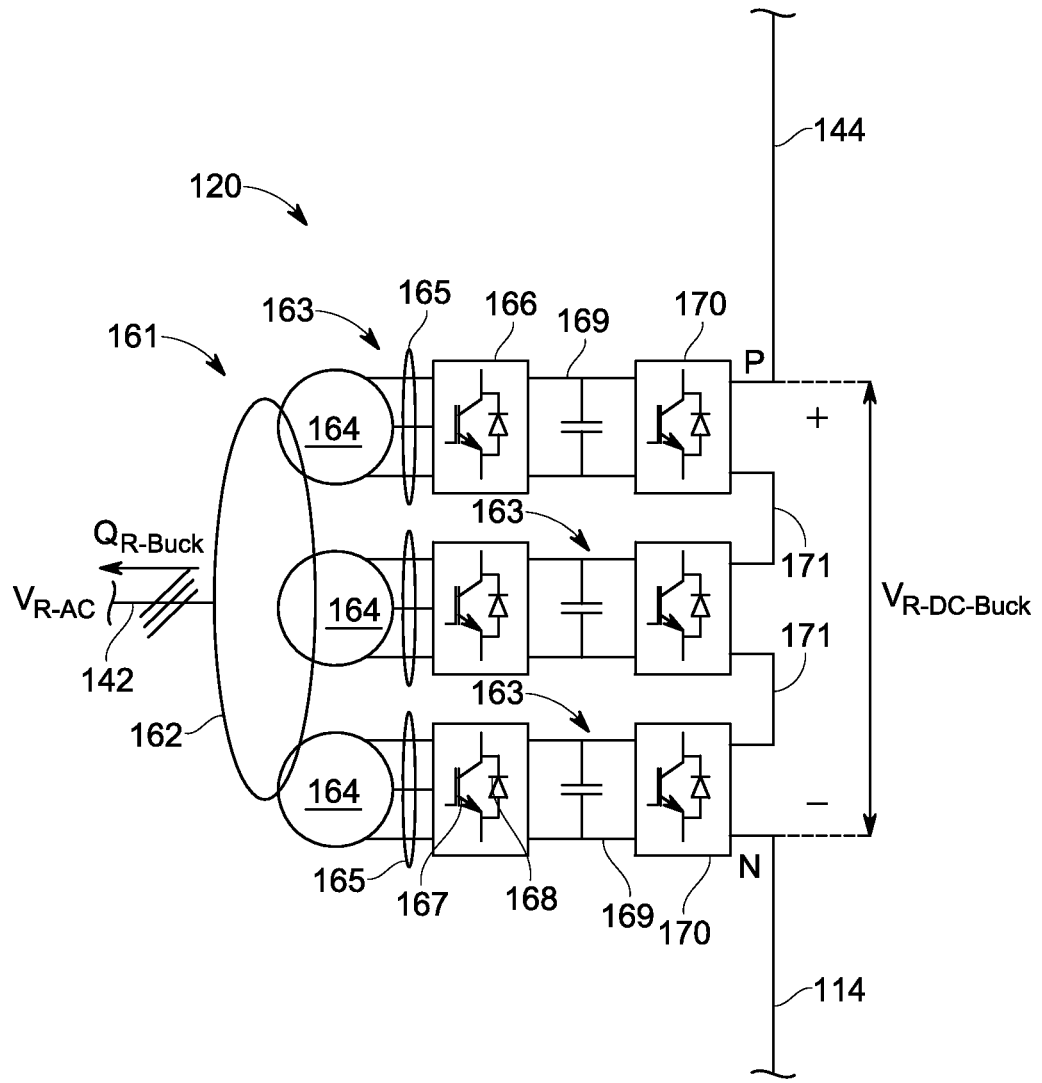
FIG. 4 is a schematic view of an exemplary HVDC buck converter that may be used with the rectifier portion shown in FIG. 2.

FIG. 4 is a schematic view of exemplary HVDC rectifier buck converter 120 that may be used with rectifier portion 108 (shown in FIG. 2). Rectifier buck converter 120 includes a transformer 161 that includes primary windings 162 coupled to DC conduit 144. Rectifier buck converter 120 also includes a plurality of legs 163, i.e., three legs 163. Alternatively, rectifier buck converter 120 includes any number of legs 163 that enables operation of buck converter 120 as described herein. Transformer 161 and each of legs 163 include a set of secondary windings 164 operatively coupled to primary windings 162. Alternatively, HVDC rectifier buck converter 120 may include one independent transformer for each leg 163. Also, alternatively, HVDC rectifier buck converter 120 includes any transformer configuration that enables operation of converter 120 as described herein.

Each leg 163 also includes a plurality of three-phase conduits 165 coupled to secondary windings 164. Each leg 163 further includes an AC-to-DC rectifier portion 166 that includes semiconductor devices 167, e.g., insulated gate bipolar transistors (IGBTs), with off-on characteristics, in parallel with an anti-paralleling diode 168. Alternatively, any semiconductor devices that enable operation of buck converter 120 as described herein are used, including, without limitation, insulated gate commutated thyristors (IGCTs), silicon controlled rectifiers (SCRs), gate commutated thyristors (GCTs), symmetrical gate commutated thyristors (SGCTs), and gate turnoff thyristors (GTOs). Rectifier portion 166 may also function as a DC-to-AC inverter to facilitate a reversed current flow.

Each leg 163 also includes a DC link 169 coupled to rectifier portion 166 and a DC-DC voltage regulator 170 coupled to each DC link 169. In the exemplary embodiment, DC-DC voltage regulator 170 is a soft-switching converter that operates at a fixed frequency and duty cycle in a manner similar to a DC-to-DC transformer. Alternatively, DC-DC voltage regulator 170 is any device that enables operation of buck converter 120 as described herein. DC-DC voltage regulators 170 are coupled in a cascading manner through a plurality of cascading links 171.

In operation, each leg 163 receives a portion of $V_{R\text{-}AC}$ induced on rectifier buck converter conduit 142. The cascaded configuration of legs 163 facilitates lower AC voltages at conduits 165 such that finer control of $V_{R\text{-}DC\text{-}Buck}$ is also facilitated. In some embodiments, depending on the value of $V_{R\text{-}AC}$, transformer 161 is a step-down transformer to facilitate reducing the voltage rating of each leg 163. Also, in some embodiments, depending on the value of $V_{R\text{-}AC}$, transformer 161 is a step-up transformer to facilitate increasing the voltage rating of each leg 163.

Further, in operation, the switching action of semiconductor devices 167 in AC-to-DC rectifier portion 166 may be used to generate reactive power $Q_{R\text{-}Buck}$ for the electric power transmitted from power system 102. In addition, rectifier buck converter 120 may be used to compensate for non-characteristic harmonic AC currents as well as facilitating compensation of the characteristic, dominant harmonic AC currents, e.g., $11^{th}$ and $13^{th}$ harmonics.

Figure 5:
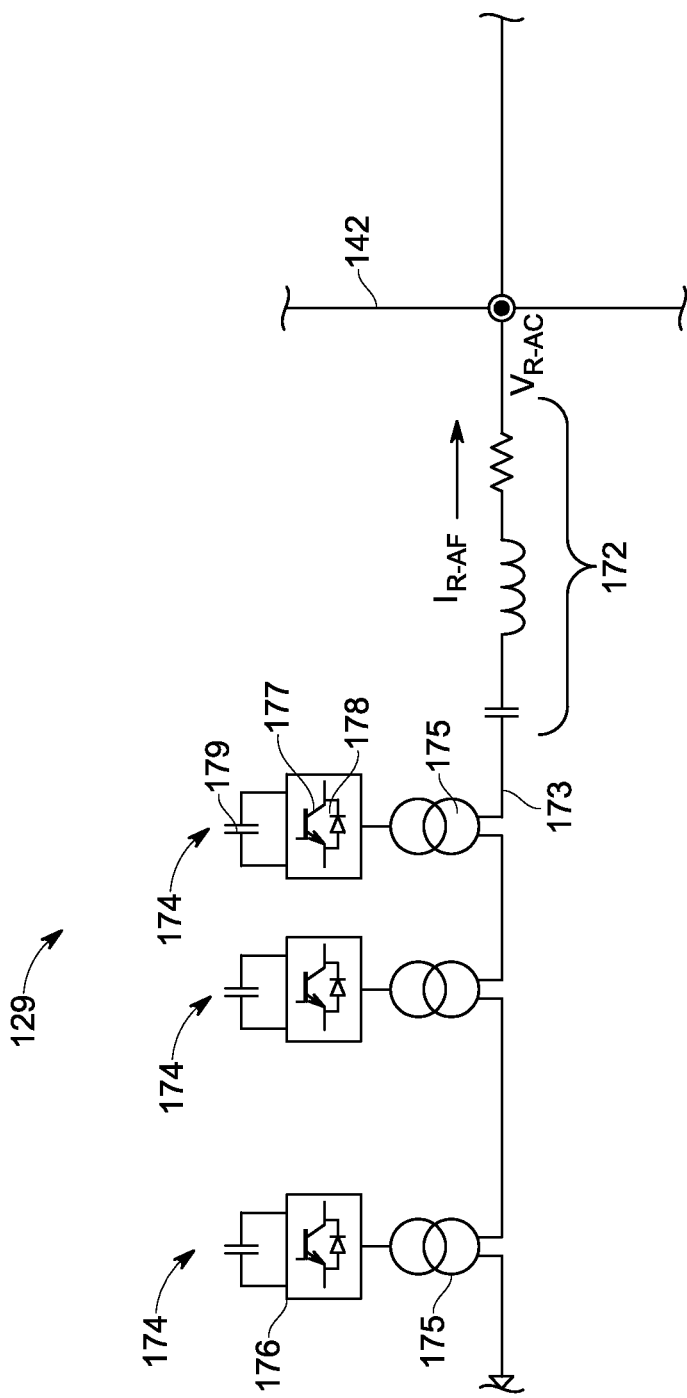
FIG. 5 is a schematic view of an exemplary hybrid filtering device that may be used with the rectifier portion shown in FIG. 2.

FIG. 5 is a schematic view of exemplary rectifier hybrid filtering device 129 that may be used with rectifier portion 108 (shown in FIG. 2). Hybrid filtering device 129 is optional for systems that operate a low voltage/power. However, those systems that operate at high voltage/power will likely need harmonic current support. In the exemplary embodiment, rectifier hybrid filtering device 129 includes a plurality of reactive and resistive devices 172 are coupled in series along a conduit 173. Only one of each type of device with properties of resistance, inductive reactance, and capacitive reactance are shown. However, any number of such devices in any configuration with any values that enables operation of hybrid filtering device 129 as described herein may be used. In the exemplary embodiment, reactive and resistive devices 172 define a passive band pass filter and/or a high pass filter to facilitate inducing a very high impedance to the fundamental frequency components of grid voltage and relatively low impedance to the higher order harmonic voltage components.

Rectifier hybrid filtering device 129 also includes a plurality of filtering legs 174, i.e., three legs 174. Alternatively, hybrid filtering device 129 includes any number of legs 174 that enables operation of hybrid filtering device 129 as described herein. Each leg 174 includes an open-winding transformer 175 to facilitate voltage transmission and reduce current transmission. In some embodiments, depending on the value of $V_{R-AC}$, transformer 175 is a step-down transformer to facilitate reducing the voltage rating of each leg 174. Also, in some embodiments, depending on the value of $V_{R-AC}$, transformer 175 is a step-up transformer to facilitate increasing the voltage rating of each leg 174.

Each leg 174 also includes at least one semiconductor-based converter 176 that includes semiconductor devices 177, e.g., thyristor devices or IGBTs, with off-on characteristics, in parallel with an anti-paralleling diode 178. Alternatively, any semiconductor devices that enable operation of hybrid filtering device 129 as described herein are used, including, without limitation, insulated gate commutated thyristors (IGCTs), silicon controlled rectifiers (SCRs), gate commutated thyristors (GCTs), symmetrical gate commutated thyristors (SGCTs), and gate turnoff thyristors (GTOs). Each leg 174 further includes a capacitor 179 to facilitate consistent operation of semiconductor-based converters 176. Semiconductor-based converters 176 are configured to generate pulse width modulated (PWM) waveforms to generate harmonic AC voltages with amplitudes less than approximately a tenth of the voltages induced on conduit 142 and PWM switching frequencies of approximately a few kilohertz to generate and transmit, i.e., inject AC currents $I_{R-AF}$ having, without limitation, the dominant 11th and 13th harmonics to LCC 118 to compensate for such harmonics generated by LCC 118. Such harmonic generation facilitates meeting grid sinusoidal current standards.

Figure 6:
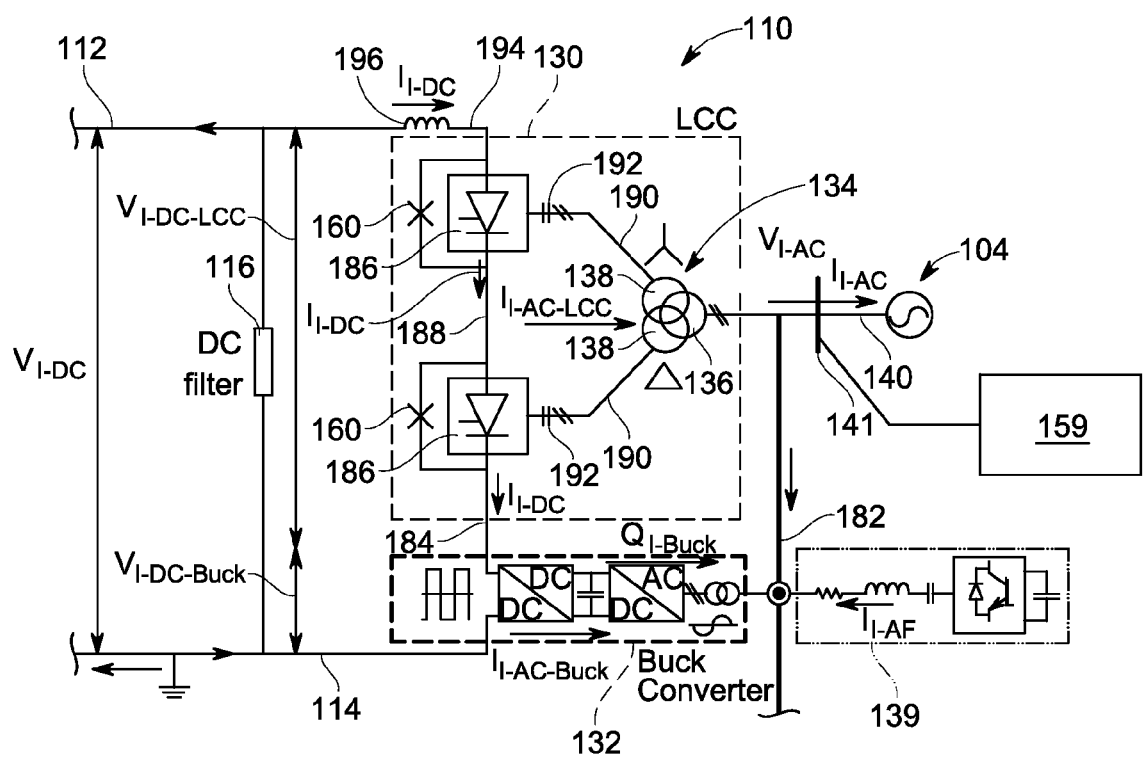
FIG. 6 is a schematic view of an exemplary inverter portion that may be used with the HVDC transmission system shown in FIG. 1.

FIG. 6 is a schematic view of exemplary inverter portion 110 that may be used with the HVDC transmission system 100 (shown in FIG. 1). In general, rectifier portion 108 and inverter portion 110 have substantially similar circuit architectures. In the exemplary embodiment, primary windings 136 are coupled to electric power transmission and distribution grid 104 through second AC conduits 140. Inverter buck converter 132 is coupled to second AC conduits 140 between grid 104 and primary windings 136 through an inverter buck converter conduit 182. Therefore, inverter buck converter 132 and inverter LCC 130 are coupled in parallel with grid 104. Moreover, inverter buck converter 132 and inverter LCC 130 are coupled in series with each other through a DC conduit 184.

Also, in the exemplary embodiment, inverter LCC 130 includes a plurality of HVDC inverter devices 186 (only two shown) coupled to each other in series through a DC conduit 188. HVDC inverter devices 186 are substantially similar to HVDC rectifier devices 146 (shown in FIG. 2). Each of HVDC inverter devices 186 is coupled in parallel to one of secondary windings 138 through a plurality of AC conduit 190 (only one shown in FIG. 6) and a series capacitive device 192. At least one HVDC inverter device 186 is coupled to HVDC transmission conduit 112 through an HVDC conduit 194 and an inductive device 196. Also, at least one HVDC inverter device 196 is coupled in series to inverter buck converter 132 through DC conduit 184.

Figure 7:
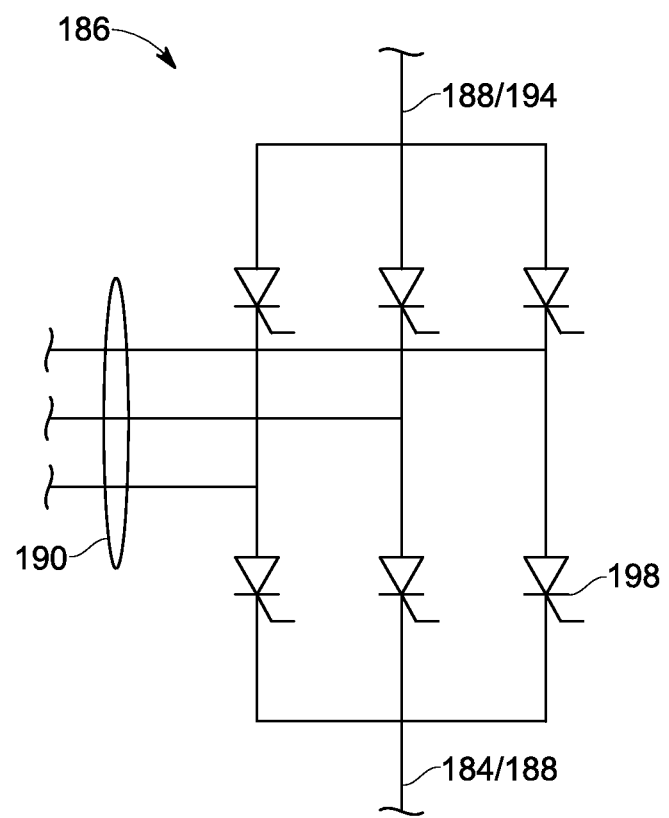
FIG. 7 is a schematic view of an exemplary HVDC inverter device that may be used with the inverter portion shown in FIG. 6.

FIG. 7 is a schematic view of an exemplary HVDC inverter device 186 that may be used with inverter portion 110 (shown in FIG. 6), and more specifically, with inverter LCC 130 (shown in FIG. 6). In the exemplary embodiment, HVDC inverter device 186 is a thyristor-based device that includes a plurality of thyristors 198 that are substantially similar to thyristors 158 (shown in FIG. 3). Alternatively, HVDC inverter device 186 uses any semiconductor devices that enable operation of inverter LCC 130, inverter portion 110, and HVDC transmission system 100 (shown in FIG. 1) as described herein, including, without limitation insulated gate commutated thyristors (IGCTs) and insulated gate bipolar transistors (IGBTs). In a manner similar to rectifier LCC 118 facilitating regulation of firing angle α for thyristors 158, inverter LCC 130 facilitates constant extinction angle control.

Referring again to FIG. 6, inverter buck converter 132 and inverter LCC 130 are coupled in a cascading series configuration between HVDC transmission conduits 112 and 114. Moreover, a voltage of $V_{I-DC-LCC}$ is induced across inverter LCC 130, a voltage of $V_{I-DC-Buck}$ is induced across inverter buck converter 132, and $V_{I-DC-LCC}$ and $V_{I-DC-Buck}$ are summed to define $V_{V-DC}$, i.e., the total DC voltage induced between HVDC transmission conduits 112 and 114 by inverter portion 110. Furthermore, an electric current of $I_{I-AC-LCC}$ is generated by inverter LCC 130, an electric current of $I_{R-AC-Buck}$ is generated by inverter buck converter 132, and $I_{T-AC-LCC}$ and $I_{I-AC-Buck}$ are summed to define the net electric current (AC) transmitted to grid 104, i.e., $I_{I-AC}$. Second AC conduits 140 are operated at an AC voltage of $V_{I-AC}$ as induced by grid 104.

Further, in the exemplary embodiment, inverter LCC 130 is configured to convert and transmit active power within a range between approximately 85% and approximately 100% of a total active power rating of HVDC transmission system 100. Moreover, inverter buck converter 132 is configured to convert and transmit active power within a range between approximately 0% and approximately 15% of the total active power rating of HVDC transmission system 100.

Inverter LCC 130 also includes a switch device 160 that is coupled in parallel with each associated HVDC inverter device 186. In the exemplary embodiment, switch device 160 is manually and locally operated to close to bypass the associated HVDC inverter device 186. Alternatively, switch device 160 may be operated remotely.

In the exemplary embodiment, inverter buck converter 132 supplies reactive power $Q_{I-Buck}$ to grid 104, i.e., approximately 10% of the reactive power rating of inverter portion 110, to control a grid power factor to unity or other values. In addition, inverter buck converter 132 cooperates with rectifier buck converter 120 (shown in FIGS. 1 and 2) to substantially control transmission of harmonic currents to grid 104. Specifically, inverter buck converter 132 compensates for the non-characteristic harmonic AC currents, e.g., and without limitation, the $3^{rd}$ harmonic, as well as facilitating compensation for the dominant harmonic AC currents, e.g., and without limitation, the $11^{th}$ and $13^{th}$ harmonics. Also, inverter hybrid filter device 139 may be used to compensate for those significant, i.e., dominant harmonic currents $I_{I-AF}$, e.g., and without limitation, $11^{th}$ and $13^{th}$ harmonics while maintaining total harmonic distortion (THD) in the grid current, i.e., $I_{I-AC}$ as transmitted to grid 104, below the maximum THD per grid standards. Therefore, buck converters 120 and 132 substantially obviate a need for large filtering devices and facilities. However, alternatively, some filtering may be required and residual filters 157 (shown in FIG. 2) and 159 may be installed at associated AC collectors 103 (shown in FIG. 2) and 141, respectively, to mitigate residual high frequency harmonic currents uncompensated for by buck converters 120 (shown in FIG. 2) and 132 to meet telephonic interference specifications and/or systems specifications in general. Such additional residual filters 157 and 159 may be configured to cooperate with hybrid filter devices 129 (shown in FIG. 2) and 139.

Referring to FIGS. 1 through 7, during normal power generation operation, electric power system 102 generates electric power through generators 101 that includes three-phase AC. Electric power generated by electric power system 102 is transmitted to AC collector 103 and first AC conduits 128 with a current of $I_{R-AC}$ and a voltage of $V_{R-AC}$. Approximately 85% to approximately 100% of $I_{R-AC}$ is transmitted to rectifier LCC 118 through rectifier LCC transformer 122 to define $I_{R-AC-LCC}$. Moreover, approximately 0% to approximately 15% of $I_{R-AC}$ is transmitted to rectifier buck converter 120 through rectifier buck converter conduit 142 to define $I_{R-AC-Buck}$.

Also, during normal power generation operation, $I_{R-AC-LCC}$ is bifurcated approximately equally between the two AC conduits 150 to each HVDC rectifier device 146 through associated series capacitive devices 152. Switch devices 160 are open and thyristors 158 operate with firing angles α of less than 5°. The associated firing lag facilitates an associated lag between the electric current transmitted through thyristor 158 and the voltage induced by thyristor 158. Each associated series capacitive device 152 facilitates establishing such low values of firing angle α. This facilitates decreasing reactive power consumption by rectifier LCC 118. $V_{R-DC-LCC}$ is induced.

Further, during normal power generation operation, rectifier buck converter 120 induces voltage $V_{R-DC-Buck}$. $V_{R-DC-Buck}$ and $V_{R-DC-LCC}$ are summed in series to define $V_{R-DC}$. $V_{R-DC-LCC}$ represents a much greater percentage of $V_{R-DC}$ than does $V_{R-DC-Buck}$, i.e., approximately 85% or higher as compared to approximately 15% or lower, respectively. Series-coupled rectifier LCC 118 and rectifier buck converter 120 both transmit all of $I_{R-DC}$.

Since $V_{R-DC-LCC}$ represents a much greater percentage of $V_{R-DC}$ than does $V_{R-DC-Buck}$, during normal power generation operation, rectifier LCC 118 effectively establishes the transmission voltage $V_{R-DC}$. In the exemplary embodiment, rectifier LCC 118 establishes the transmission voltage such that $V_{R-DC-LCC}$ is approximately equal to a $V_{I-DC-LCC}$ at inverter LCC 130. Rectifier LCC 118 consumes reactive power from power system 102 at a substantially low value, i.e., less than 20% of the power rating of rectifier LCC 118. In addition, rectifier LCC 118 quickly decreases $V_{R-DC}$ in the event of a DC fault or DC transient.

Also, since rectifier buck converter 120 operates at a DC voltage approximately 15% or lower of $V_{R-DC}$, during normal power generation operation, rectifier buck converter 120 varies $V_{R-DC-Buck}$ and to regulate rectifier buck converter 120 such that rectifier buck converter 120 effectively regulates $I_{R-DC}$ through substantially an entire range of operational values of current transmission though HVDC transmission system 100. As such, electric power orders, i.e., electric dispatch commands are implemented through a control system (not shown) coupled to rectifier buck converter 120. In addition, rectifier buck converter 120 facilitates active filtering of and/or compensation for AC current harmonics as described above.

Further, during normal power generation operation, rectifier portion 108 rectifies the electric power from three-phase AC power to DC power. The DC power is transmitted through HVDC transmission conduits 112 and 114 to inverter portion 110 that converts the DC power to three-phase, AC power with pre-determined voltages, currents, and frequencies for further transmission to electric power transmission and distribution grid 104.

More specifically, $I_{R-DC}$ is transmitted to inverter portion 110 through HVDC transmission conduits 112 and 114 such that current $I_{T-DC}$ is received at inverter LCC 130. Moreover, a voltage of $V_{I-DC-LCC}$ is generated by inverter LCC 130, a voltage of $V_{I-DC-Buck}$ is generated across inverter buck converter 132, and $V_{I-DC-LCC}$ and $V_{I-DC-Buck}$ are summed to define $V_{I-DC}$.

Furthermore, $I_{I-AC-LCC}$ is bifurcated into two substantially equal parts that are transmitted through HVDC inverter devices 186, associated series capacitive devices 192, AC conduits 190, and inverter LCC transformer 134 to generate AC current $I_{I-AC-LCC}$ that is transmitted to second AC conduits 140. Current $I_{R-AC-Buck}$ is generated by inverter buck converter 132 and transmitted through inverter buck converter conduit 182. $I_{I-AC-LCC}$ and $I_{I-AC-Buck}$ are summed to define $I_{I-AC}$ that is transmitted through second AC conduits 140 that are operated at AC voltage $V_{I-AC}$ as induced by grid 104. AC current $I_{I-AC-LCC}$ is approximately 85% to 100% of $I_{I-AC}$ and AC current $I_{R-AC-Buck}$ is approximately 0% to 15% of $I_{I-AC}$.

Moreover, during normal power generation operation, inverter buck converter 132 supplies reactive power $Q_{I-Buck}$ to grid 104, i.e., approximately 10% of the reactive power rating of inverter portion 110, to control a grid power factor to unity or other values. In addition, inverter buck converter 132 cooperates with rectifier buck converter 120 to substantially control transmission of harmonic currents to grid 104. Inverter buck converter 132 may compensate for non-characteristic harmonic AC currents, e.g., and without limitation, the $3^{rd}$ harmonic as compared to the dominant harmonic AC currents, e.g., and without limitation, the $11^{th}$ and $13^{th}$ harmonics. Also, inverter hybrid filter device 139 may be used to compensate for those significant, i.e., dominant harmonic currents $I_{I-AF}$, e.g., and without limitation, $11^{th}$ and $13^{th}$ harmonics while maintaining total harmonic distortion (THD) in the grid current, i.e., $I_{I-AC}$ as transmitted to grid 104, below the maximum THD per grid standards.

In general, during steady state normal power generation operation, electric power flow from electric power system 102 through system 100 to grid 104 is in the direction of the arrows associated with $I_{R-DC}$ and $I_{I-DC}$. Under such circumstances, rectifier LCC 118 establishes a DC voltage approximately equal to the DC transmission voltage $V_{R-DC}$, rectifier buck converter 120 controls generation and transmission of DC current, i.e., $I_{R-DC}$, inverter LCC 130 controls in a manner similar to rectifier LCC 118 by establishing a DC voltage approximately equal to the DC transmission voltage $V_{R-DC}$, and inverter buck converter 132 is substantially dormant. As rectifier buck converter 120 approaches its predetermined ratings, inverter buck converter 132 begins to assume control of $I_{R-DC}$.

However, in the exemplary embodiment, both rectifier portion 108 and inverter portion 110 are bidirectional. For example, for those periods when no electric power generators are in service within system 102, electric power is transmitted from grid 104 through system 100 to system 102 to power auxiliary equipment that may be used to facilitate a restart of a generator within system 102 and to maintain the associated equipment operational in the interim prior to a restart. Based on the direction of power flow, either of rectifier buck converter 120 or inverter buck converter 132 controls the DC line current $I_{R-DC}$ and $I_{I-DC}$.

Figure 8:
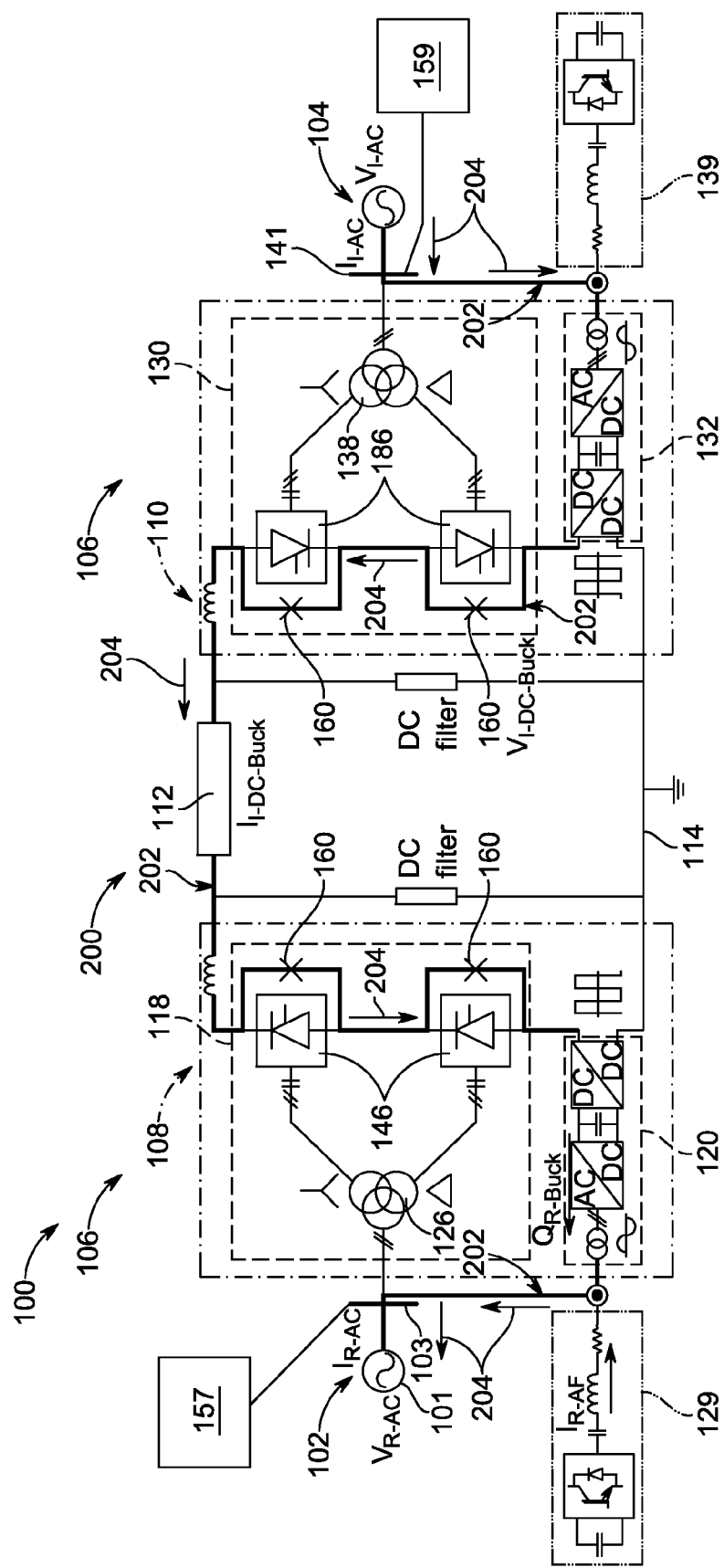
FIG. 8 is a schematic view of an exemplary black start configuration that may be used with the HVDC transmission system shown in FIG. 1.

FIG. 8 is a schematic view of an exemplary black start configuration 200 that may be used with the HVDC transmission system 100. In the exemplary embodiment, a black start flow path 202 is defined from grid 104 through inverter buck converter 132, switch devices 160 in inverter LCC 130, HVDC transmission conduit 112, switch devices 160 in rectifier LCC 118, and rectifier buck converter 120 to AC collector 103 in electric power system 102.

In the exemplary embodiment, both rectifier portion 108 and inverter portion 110 are bidirectional. For example, for those periods when no electric power generators are in service within system 102, electric power is transmitted from grid 104 through system 100 to system 102 to power auxiliary equipment that may be used to facilitate a restart of a generator within system 102 and to maintain the associated equipment operational in the interim prior to a restart. Based on the direction of power flow, either of rectifier buck converter 120 or inverter buck converter 132 controls the DC line current $I_{R-DC}$ and $I_{I-DC}$.

In black start operation, HVDC transmission system 100 starts with substantially most devices between grid 104 and system 102 substantially deenergized. Switch devices 160 are closed, either locally or remotely, thereby defining a portion of path 202 that bypasses transformers 134 and 122, HVDC inverter devices 186, and HVDC rectifier devices 146, and directly coupling buck converters 132 and 120 with HVDC conduit 112.

Also, in black start operation, inverter buck converter 132 charges rectifier buck converter 120 through switch devices 160 and HVDC conduit 112 with DC power. Specifically, grid 104 provides a current of $I_{I-AC}$ at a voltage of $V_{I-AC}$ to inverter buck converter 132. Inverter buck converter 132 induces a voltage of $V_{I-DC-Buck}$ and charges HVDC conduit 112 and rectifier buck converter 120 to a predetermined DC voltage, i.e., $V_{I-DC-Buck}$. Once the voltage of $V_{I-DC-Buck}$ is established, a current of $I_{I-DC-Buck}$ is transmitted from inverter buck converter 132, through HVDC conduit 112, to rectifier buck converter 120. Rectifier buck converter 120 establishes a three-phase AC voltage $V_{R-AC}$ at AC collector 103 in a manner similar to that of a static synchronous compensation AC regulating device, i.e., STATCOM. Also, rectifier buck converter 120 facilitates generating reactive power $Q_{R-Buck}$ for the electric power transmitted from power system 102. For those occasions when harmonic current support is required, rectifier hybrid filter device 129 and rectifier buck converter 120 may be used. Specifically, rectifier buck converter 120 may be used to compensate for the non-characteristic harmonic AC currents as well as the dominant harmonic AC currents as described above. Further, AC currents $I_{R-AF}$ in the dominant 11th and 13th harmonics may be used to compensated for such harmonics generated elsewhere prior to transmission to system 102. Such harmonic compensation facilitates meeting sinusoidal current standards.

Current $I_{I-DC-Buck}$ is transmitted through HVDC transmission system 100 to arrive at system 102 as $I_{R-AC}$ as indicated by arrows 204. Once sufficient AC power has been restored to system 102 to facilitate a base level of equipment operation, LCCs 118 and 130 may be restored to service, in a coordinated opening of bypass switches 160, such that a small firing angle α is established. Both buck converters 120 and 132 may be used to coordinate a restoration of DC power in HVDC transmission system 100.

Figure 9:
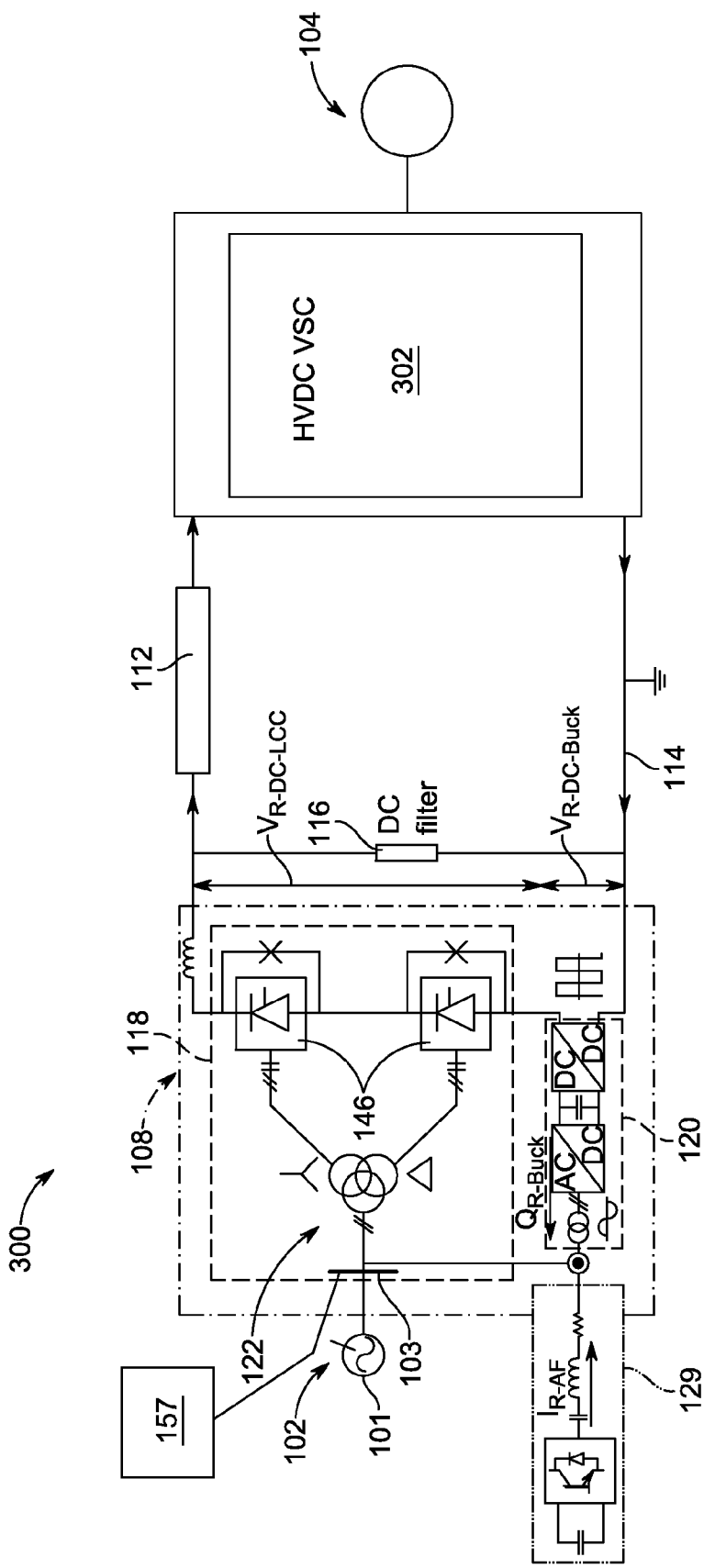
FIG. 9 is a schematic view of an exemplary alternative embodiment of the HVDC transmission system shown in FIG. 1.

FIG. 9 is a schematic view of an exemplary alternative HVDC transmission system 300. In the exemplary embodiment, system 300 includes a HVDC voltage source converter (VSC) 302. VSC 302 may be any known VSC. For example, and without limitation, HVDC VSC 302 includes a plurality of three-phase bridges (not shown), each bridge having six branches (not shown). Each branch includes a semiconductor device (not shown), e.g., a thyristor device or an IGBT, with off-on characteristics, in parallel with an anti-paralleling diode (not shown). HVDC VSC 302 also includes a capacitor bank (not shown) that facilitates stiffening the voltage supply to VSC 302. VSC 302 further includes a plurality of filtering devices (not shown) to filter the harmonics generated by the cycling of the semiconductor devices. HVDC transmission system 300 also includes rectifier portion 108, including LCC 118, buck converter 120, and hybrid filtering device 129. In the exemplary embodiment, inverter portion 110 (shown in FIG. 1) is replaced with VSC 302. Alternatively, inverter portion 110 may be used and rectifier portion 108 may be replaced with VSC 302.

In operation, LCC 118, buck converter 120, and hybrid filtering device 129 operate as described above. However, VSC 302 does not have the features and capabilities to control DC fault current. VSC 302 can supply reactive power to a large extent to system 104. The scenario described above and shown in FIG. 9 is suitable, for example, for offshore generation where rectifier portion 108 does not require a strong AC grid, but may require a black start capability, whereas the onshore VSC station 302 that connects the HVDC to grid 104 does require a strong grid voltage support such that VSC 302 may perform satisfactorily.

Figure 10:
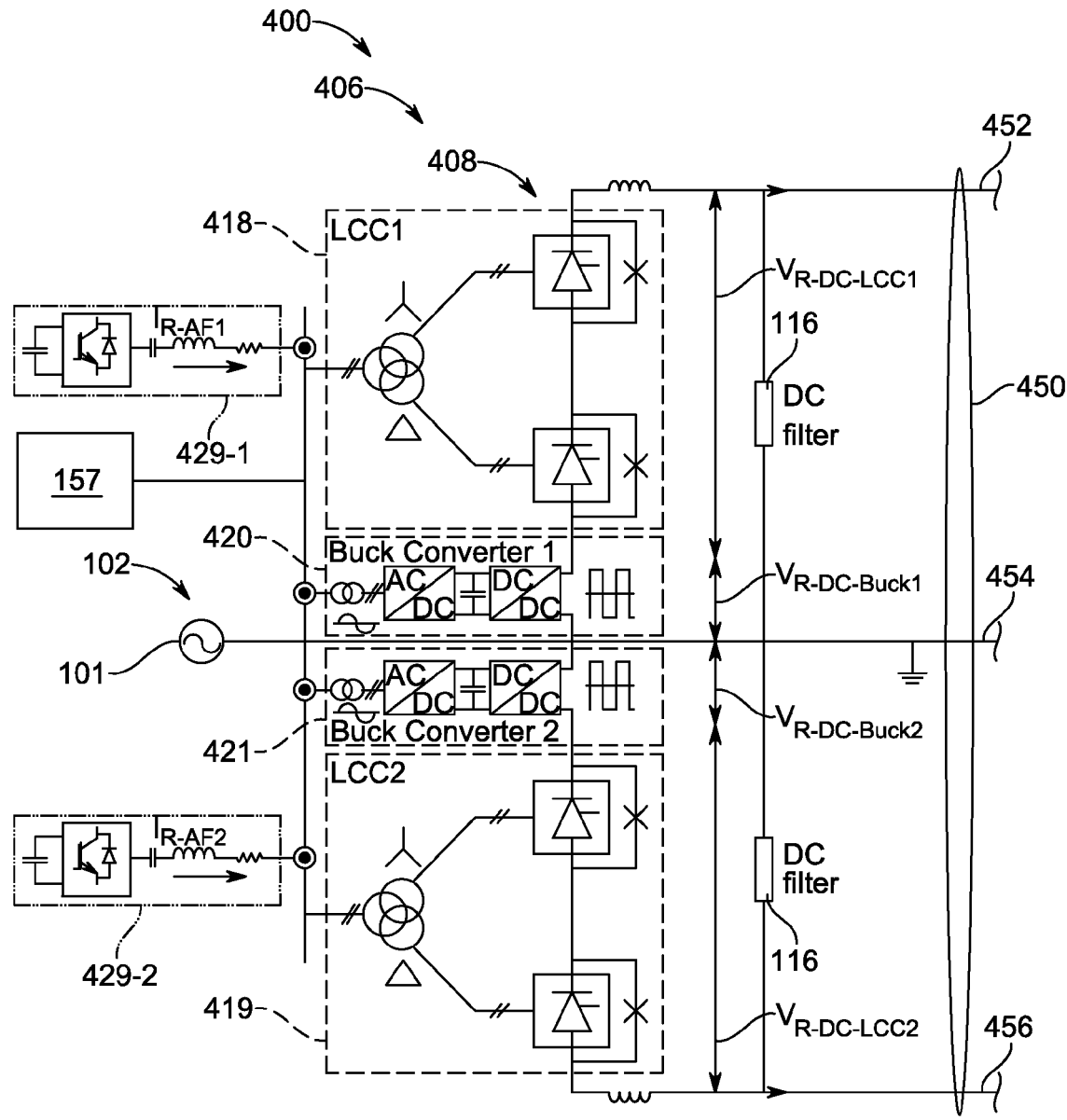
FIG. 10 is a schematic view of another exemplary alternative embodiment of the HVDC transmission system shown in FIG. 1.

FIG. 10 is a schematic view of another exemplary alternative HVDC transmission system 400. System 400 is a bi-polar system that includes an alternative HVDC converter system 406 with an alternative rectifier portion 408 that includes a first rectifier LCC 418 and a first rectifier buck converter 420 coupled in a symmetrical relationship with a second rectifier LCC 419 and a second rectifier buck converter 421. System 400 also includes a first rectifier hybrid filter device 429-1 coupled in parallel to first rectifier buck converter 420 and a second rectifier hybrid filter device 429-2 coupled in parallel to second rectifier buck converter 421. First and second rectifier hybrid filter devices 429-1 and 429-2, respectively, are substantially similar to rectifier hybrid filter device 129 (shown in FIGS. 1, 2, 5, 8, and 9). Two rectifier hybrid filter devices are shown in the exemplary embodiment for purposes of equipment redundancy. Alternatively, system 400 may have any number of rectifier hybrid filter devices that enables operation of system 400 as described herein. Residual filter 157 may be used to mitigate residual high frequency harmonic currents uncompensated for by buck converters 420 and 421 to meet telephonic interference specifications and/or systems specifications in general. Such additional residual filter 157 cooperates with hybrid filter devices 429-1 and 429-2.

System 400 further includes an alternative inverter portion (not shown) that is substantially similar in configuration to rectifier portion 408 as rectifier portion 108 and inverter portion 110 (both shown in FIG. 1) are substantially similar. In this alternative exemplary embodiment, rectifier portion 408 is coupled to the inverter portion through a bi-polar HVDC transmission conduit system 450 that includes a positive conduit 452, a neutral conduit 454, and a negative conduit 456.

In operation, system 400 provides an increased electric power transmission rating over that of system 100 (shown in FIG. 1) while facilitating a similar voltage insulation level. Buck converters 420 and 421 are positioned between LCCs 418 and 419 to facilitate buck converters 420 and 421 operating at a relatively low DC potential as compared to LCCs 418 and 419 and conduits 452 and 456. Also, in the event of a failure of one of conduits 452 and 456, at least a portion of system 400 may be maintained in service. Such a condition includes system 400 operating at approximately 50% of rated with one related LCC/buck converter pair, neutral conduit 454 in service, and one of conduits 452 and 456 in service. Moreover, for those occasions when harmonic current support is required, rectifier hybrid filter devices 429-1 and 429-2 and rectifier buck converters 430 and 421 may be used. Specifically, rectifier buck converters 420 and 421 may be used to compensate for non-characteristic harmonic AC currents, e.g., and without limitation, the $3^{rd}$ harmonic as well as facilitating compensation for the dominant harmonic AC currents, e.g., and without limitation, the $11^{th}$ and $13^{th}$ harmonics. Therefore, AC currents $I_{R-AF1}$ and $I_{R-AF2}$ in the dominant 11th and 13th harmonics may be used to compensate for such harmonics generated elsewhere prior to transmission to system 102 from rectifier hybrid filter devices 429-1 and 429-2 to facilitate harmonic compensation that facilitates meeting sinusoidal current standards.

Figure 11:
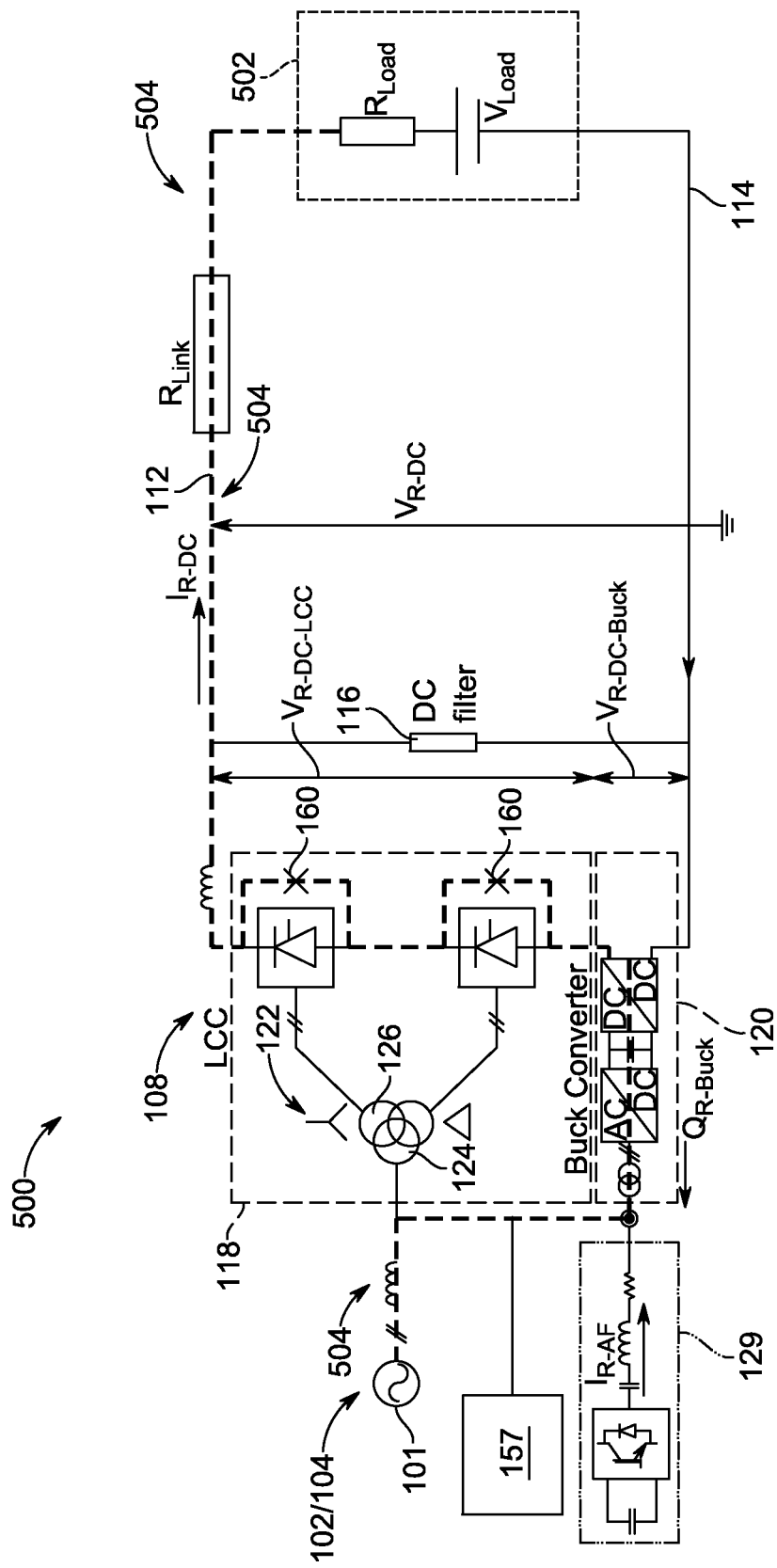
FIG. 11 is a schematic view of yet another exemplary alternative embodiment of the HVDC transmission system shown in FIG. 1.

FIG. 11 is a schematic view of yet another exemplary alternative embodiment of HVDC transmission system 500. In the exemplary embodiment, system 500 includes a HVDC load 502 that may be any known HVDC load. For example, and without limitation, HVDC load 502 includes a plurality of HVDC pump motors (not shown), or it may be an HVDC power system, e.g., a DC grid. HVDC transmission system 500 also includes rectifier portion 108, including LCC 118, buck converter 120, and hybrid filtering device 129. In the exemplary embodiment, inverter portion 110 (shown in FIG. 1) is replaced with HVDC load 502. Alternatively, inverter portion 110 may be used and rectifier portion 108 may be replaced with HVDC load 502. HVDC transmission conduits 112 and 114 have a combined DC link resistance $R_{Link}$. Also, HVDC load 502 has a load resistance $R_{Load}$ and a load voltage drop $V_{Load}$. In this alternative exemplary embodiment, line current $I_{R-DC} = [V_{R-DC-LCC} + V_{R-DC-Buck} - V_{Load}]/[R_{Link} + R_{Load}]$. Further, in this alternative exemplary embodiment, $V_{R-DC-Buck}$ is regulated such that at rated loading conditions of HVDC load 502 $V_{R-DC-LCC}$ approximately equals $V_{Load}$. Either of a power generation device 101, a power system 102, or electric power transmission and distribution grid 104 may be coupled to system 500.

In operation, LCC 118, buck converter 120, and hybrid filtering device 129 operate as described above. Also, for those scenarios where a black start capability may be required, for example, and without limitation, when power system 102 represents offshore power generation, where HVDC load 502 includes an active load or a DC grid, and where rectifier portion 108 does not require a strong AC grid, but may require a black start capability. Such black start capability may be achieved through a black start path 504 that is similar to black start path 202 (shown in FIG. 8). Further, rectifier buck converter 120 facilitates generating reactive power $Q_{R-Buck}$ up to approximately 10% of the reactive power rating of rectifier portion 108 for the electric power transmitted from power system 102. In addition, rectifier buck converter 120 facilitates compensating for non-characteristic harmonic AC currents, e.g., and without limitation, the $3^{rd}$ harmonic as well as facilitating compensation for the dominant harmonic AC currents, e.g., and without limitation, the $11^{th}$ and $13^{th}$ harmonics. Compensation for such non-characteristic harmonic AC currents may be required to facilitate operation of rectifier LCC transformer 122 due to possible impedance mismatches between delta and wye windings. In addition, hybrid filtering device 129 may generate and transmit AC currents $I_{R-AF}$ that compensate for the dominant 11th and 13th harmonics to LCCs 118 and power system 102.

The above-described hybrid HVDC transmission systems provide a cost-effective method for transmitting HVDC power. The embodiments described herein facilitate transmitting HVDC power between an AC facility and an AC grid, both either remote from each other or coupled back-to-back. Specifically, the devices, systems, and methods described herein facilitate enabling black start of a remote AC facility, e.g., an off-shore wind farm. Also, the devices, systems, and methods described herein facilitate decreasing reactive power requirements of associated converter systems while also providing for supplemental reactive power transmission features. Specifically, the devices, systems, and methods described herein include using a series capacitor in a line commutated converter (LCC), thereby facilitating operation of the associated inverter at very low values of commutation angles. Additionally, the series capacitor described herein facilitates decreasing the rating of the associated buck converters, reducing the chances of commutation failure of the thyristors in the event of either an AC-side or DC-side transient and/or fault, and cooperating with the buck converters to decrease the commutation angle of the associated thyristors. Therefore, the LCC generates the majority of the DC voltage and the buck converter generates sufficient DC voltage to control the residual DC voltage, thereby facilitating control of either the output DC current or precise control of the DC output voltage.

Further, the devices, systems, and methods described herein facilitate significantly decreasing, and potentially eliminating, large and expensive switching AC filter systems, capacitor systems, and reactive power compensation devices, thereby facilitating decreasing a physical footprint of the associated system. The devices, systems, and methods described herein may compensate for dominant harmonics, e.g., the $11^{th}$ and $13^{th}$ harmonics, as well as non-characteristic harmonics, e.g., the $3^{rd}$ harmonic. Specifically, the hybrid filter devices described herein compensate for such dominant harmonics. Also, the buck converters described herein compensate for such non-characteristic harmonics in addition to partially compensating for the dominant harmonics.

Moreover, the devices, systems, and methods described herein enhance dynamic power flow control and transient load responses. Specifically, the buck converters described herein, based on the direction of power flow, control the DC line current such that the buck regulators regulate power flow, including providing robust control of the power flow such that faster responses to power flow transients are accommodated. The effects of AC grid voltage transients, up to approximately 10% of grid rated voltage, on the output DC voltage is reduced by fast action of the buck converters, thereby decreasing a need for tap changer operation of associated converter transformers. Therefore, the use of converter transformer tap changers is avoided under sustained under/over voltage conditions on the AC grid. The buck converter accordingly generates the appropriate compensating voltages. Furthermore, the LCCs described herein quickly reduce the DC link voltage in the event of DC-side fault, Also, the rectifier and inverter portions described herein facilitate reducing converter transformer ratings and AC voltage stresses on the associated transformer bushings due to the control operation performed by the buck converter both in steady state and transient operation.

An exemplary technical effect of the methods, systems, and apparatus described herein includes at least one of: (a) enabling black start of a remote AC electric power generation facility, e.g., an off-shore wind farm; (b) decreasing reactive power requirements of associated converter systems; (c) providing for supplemental reactive power transmission features; (d) decreasing the firing angle of the associated thyristors, thereby (i) facilitating operation of the associated inverter at very low values of commutation angles; (ii) decreasing the rating of the associated buck converter; (iii) reducing the chances of commutation failure of the thyristors in the event of either an AC-side or DC-side transient and/or fault; and (iv) cooperating with the buck converter to decrease the commutation angle of the thyristors; (e) significantly decreasing, and potentially eliminating, large and expensive switching AC filter systems, capacitor systems, and reactive power compensation devices, thereby decreasing a physical footprint of the associated HVDC transmission system; (f) compensating for dominant harmonics, e.g., the $11^{th}$ and $13^{th}$ harmonics and non-characteristic harmonics, e.g., the $3^{rd}$ harmonic, to meet transmission standards; (g) enhancing dynamic power flow control and transient load responses through robust regulation of power flow by the buck converters; (h) using the LCCs described herein to quickly reduce the DC link voltage in the event of DC-side fault; (i) reducing, or completely avoiding, the use of tap changers of converter transformers for typical AC power system voltage variations; and (j) reducing converter transformer ratings and AC voltage stresses on the associated transformer bushings.

Exemplary embodiments of HVDC transmission systems for coupling power generation facilities and the grid, and methods for operating the same, are described above in detail. The HVDC transmission systems, HVDC converter systems, and methods of operating such systems are not limited to the specific embodiments described herein, but rather, components of systems and/or steps of the methods may be utilized independently and separately from other components and/or steps described herein. For example, the methods may also be used in combination with other systems requiring HVDC transmission and methods, and are not limited to practice with only the HVDC transmission systems, HVDC converter systems, and methods as described herein. Rather, the exemplary embodiment can be implemented and utilized in connection with many other high power conversion applications that currently use only LCCs, e.g., and without limitation, multi-megawatt sized drive applications and back-to-back connections where black start may not be required.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A high voltage direct current (HVDC) converter system comprising:
    at least one line commutated converter (LCC) configured to convert a plurality of alternating current (AC) voltages and currents to a regulated direct current (DC) voltage of one of positive and negative polarity and a DC current transmitted in only one direction;
    at least one buck converter configured to convert the plurality of AC voltages and currents to a regulated DC voltage, wherein said at least one LCC and said at least one buck converter are coupled in parallel to at least one AC conduit and are coupled in series to at least one DC conduit;
    wherein the at least one buck converter is configured to generate the DC voltage of positive and negative polarities and is further configured to transmit the DC current in two directions; and
    at least one filtering device coupled in parallel to said at least one buck converter through said at least one AC conduit, said at least one filtering device configured to generate AC current having at least one harmonic frequency into said HVDC converter system through said at least one AC conduit.

2. The HVDC converter system in accordance with claim 1, wherein said at least one filtering device comprises at least one hybrid filtering device coupled to said at least one AC conduit, said at least one hybrid filtering device configured to inject the AC current having at least one harmonic frequency into said at least one AC conduit.

3. The HVDC converter system in accordance with claim 1, wherein said at least one filtering device comprises a plurality of converters coupled to each other in a cascading configuration.

4. The HVDC converter system in accordance with claim 1, wherein said at least one filtering device comprises a passive filter comprising a plurality of reactive devices and resistive devices configured to facilitate inducing a first impedance to a first portion of frequency components of a voltage of an electric power system and a second impedance to a second portion of frequency components of the electric power system voltage, wherein the first impedance is greater than the second impedance.

5. The HVDC converter system in accordance with claim 1, wherein said at least one LCC and said at least one buck converter define at least one of at least one HVDC rectifier device and at least one HVDC inverter device.

6. The HVDC converter system in accordance with claim 5, wherein each of said at least one LCC is coupled in parallel to at least one switch device.

7. The HVDC converter system in accordance with claim 6, wherein said at least one buck converter and said at least one switch device at least partially define a black start current transmission path.

8. The HVDC converter system in accordance with claim 5, wherein at least one of said at least one HVDC rectifier device and said at least one HVDC inverter device comprises a residual filter configured to mitigate residual high frequency harmonic currents.

9. The HVDC converter system in accordance with claim 1, wherein said HVDC converter system comprises one of a uni-polar configuration and a bi-polar configuration.

10. The HVDC converter system in accordance with claim 1 further comprising at least one of a voltage source converter (VSC) and a load, wherein said at least one LCC and said at least one buck converter define one of at least one HVDC rectifier portion and at least one HVDC inverter portion coupled to said at least one of said VSC and said load.

11. A method of transmitting high voltage direct current (HVDC) electric power, said method comprising:
    providing at least one line commutated converter (LCC);
    coupling at least one buck converter in parallel to the at least one LCC through at least one AC conduit and in series through at least one DC conduit;
    coupling at least one filtering device in parallel to the at least one buck converter through the at least one AC conduit;
    defining a predetermined voltage differential across a HVDC transmission system with the at least one LCC;
    injecting AC current having at least one harmonic frequency into the HVDC converter system from the at least one filtering device; and
    controlling a value of current transmitted through the HVDC transmission system with the at least one buck converter
    wherein the at least one buck converter is configured to generate the DC voltage of positive and negative polarities and is further configured to transmit the DC current in two directions.

12. The method in accordance with claim 11 further comprising inducing a first DC voltage across the at least one LCC comprising:
inducing a first DC voltage across a first LCC in a HVDC rectifier device; and
inducing a second voltage across a second LCC in a HVDC inverter device, wherein the second voltage has a value that is substantially similar to a value of the first voltage.

13. The method in accordance with claim 11, wherein the at least one LCC includes at least one transformer with tap changers therein, wherein defining a predetermined voltage differential across a HVDC transmission system comprises:
inducing a first DC voltage across the at least one LCC;
inducing a second DC voltage across the at least one buck converter; and
summing the first DC voltage and the second DC voltage to regulate the predetermined voltage differential across the HVDC transmission system, thereby reducing voltage variations thereon and reducing operation of the transformer tap changers in response to the voltage variations.

14. The method in accordance with claim 9 further comprising:
experiencing a black condition within at least a portion of an AC system coupled to the HVDC transmission system; and
closing at least one switch around the at least one LCC, thereby establishing a black start AC transmission path through at least a portion of the HVDC transmission system.

15. The method in accordance with claim 14, wherein establishing a black start AC transmission path comprises:
establishing the black start AC transmission path through the at least one buck converter; and
inducing a three-phase voltage potential within at least a portion of the AC system.

16. The method in accordance with claim 11, wherein injecting AC current having at least one harmonic frequency into the HVDC converter system from the at least one filtering device comprises injecting harmonic current having a plurality of harmonic frequencies into the HVDC converter system comprising:
injecting AC current having at least one harmonic frequency into the at least one AC conduit from the at least one filtering device; and
injecting AC current having at least one harmonic frequency into the at least one AC conduit from the at least one buck converter.

17. A high voltage direct current (HVDC) transmission system comprising:
at least one alternating current (AC) conduit;
at least one direct current (DC) conduit;
a plurality of HVDC transmission conduits coupled to said at least one DC conduit; and
a HVDC converter system comprising:
at least one line commutated converter (LCC) configured to convert a plurality of alternating current (AC) voltages and currents to a regulated direct current (DC) voltage of one of positive and negative polarity and a DC current transmitted in only one direction;
at least one buck converter configured to convert a plurality of AC voltages and currents to a regulated DC voltage and a DC current, wherein said at least one LCC and said at least one buck converter are coupled in parallel to said at least one AC conduit and are coupled in series to said at least one DC conduit;
wherein the at least one buck converter is configured to generate the DC voltage of positive and negative polarities and is further configured to transmit the DC current in two directions; and
at least one filtering device coupled in parallel to said at least one buck converter through said at least one AC conduit, said at least one filtering device configured to generate AC current having at least one harmonic frequency into said at least one AC conduit.

18. The HVDC transmission system in accordance with claim 17, wherein said at least one filtering device comprises at least one hybrid filtering device coupled to said at least one AC conduit, said at least one hybrid filtering device configured to inject the AC current having at least one harmonic frequency into said at least one AC conduit.

19. The HVDC transmission system in accordance with claim 17, wherein said at least one filtering device comprises a plurality of converters coupled to each other in a cascading configuration.

20. The HVDC transmission system in accordance with claim 17, wherein said at least one filtering device comprises a passive filter comprising a plurality of reactive devices and resistive devices configured to facilitate inducing a first impedance to a first portion of frequency components of a voltage of an electric power system and a second impedance to a second portion of frequency components of the electric power system voltage, wherein the first impedance is greater than the second impedance.

* * * * *